United States Patent
Endo et al.

(10) Patent No.: US 8,457,012 B2
(45) Date of Patent: Jun. 4, 2013

(54) PACKET TRANSFER APPARATUS AND PACKET TRANSFER METHOD

(75) Inventors: Hideki Endo, Kokubunji (JP);
Masayuki Takase, Inagi (JP); Shikou Matsushima, Yokohama (JP); Akihiko Tanaka, Yokohama (JP); Takayuki Kanno, Yokohama (JP); Yoshihiro Ashi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 257 days.

(21) Appl. No.: 12/073,766

(22) Filed: Mar. 10, 2008

(65) Prior Publication Data
US 2009/0016366 A1    Jan. 15, 2009

(30) Foreign Application Priority Data

Jul. 12, 2007  (JP) .................... 2007-182971

(51) Int. Cl.
*G01R 31/08* (2006.01)
*H04W 4/00* (2009.01)
*H04L 12/28* (2006.01)

(52) U.S. Cl.
USPC ........... 370/253; 370/331; 370/338; 370/389; 370/394; 370/401

(58) Field of Classification Search
USPC .................. 370/216, 394, 474; 714/746, 748
See application file for complete search history.

(56) References Cited

U.S. PATENT DOCUMENTS

| | | | |
|---|---|---|---|
| 2002/0041596 A1* | 4/2002 | Rezaiifar et al. | 370/394 |
| 2002/0176131 A1* | 11/2002 | Walters et al. | 359/118 |
| 2003/0041208 A1* | 2/2003 | Volkmar | 710/316 |
| 2003/0053461 A1* | 3/2003 | Ross | 370/394 |
| 2004/0008693 A1* | 1/2004 | Grove et al. | 370/395.52 |
| 2005/0276252 A1* | 12/2005 | Sizeland et al. | 370/338 |
| 2006/0239204 A1* | 10/2006 | Bordonaro et al. | 370/253 |
| 2007/0195826 A1* | 8/2007 | Wang et al. | 370/498 |
| 2008/0279181 A1 | 11/2008 | Shake et al. | |

FOREIGN PATENT DOCUMENTS

| | | |
|---|---|---|
| JP | 10-243050 | 9/1998 |
| JP | 11-313087 | 11/1999 |
| JP | 2005-020071 | 6/2003 |
| JP | 2004-080139 | 3/2004 |
| JP | 2006-100900 | 9/2004 |

OTHER PUBLICATIONS

Office Action from the Japanese Patent Office for Japanese Application No. 2009-055001 mailed Feb. 28, 2012.

\* cited by examiner

*Primary Examiner* — Brandon Renner
(74) *Attorney, Agent, or Firm* — Stites & Harbison PLLC; Juan Carlos A. Marquez, Esq.; Nicholas B. Trenkle, Esq.

(57) ABSTRACT

Disclosed herewith is a packet transfer apparatus that carries out 1+1 protection switching for traffics to be received variably in both length and cycle. The apparatus enables flows to be multiplexed and the link usage efficiency to be improved without generating any buffer overflow errors. The data transfer apparatus, upon receiving the third sequentially numbered data from the first communication route before receiving the preceding second sequentially numbered data, stores the received third data in a buffer. And upon receiving the second sequentially numbered data from the second communication route, the apparatus sends the second and third data sequentially. Then, upon receiving the third sequentially numbered data from the second communication route before receiving the second sequentially numbered data, the apparatus sends the third data when a predetermined waiting time expires.

14 Claims, 29 Drawing Sheets

FIG. 7A

HEADER PROCESSING TABLE 20

| VLAN ID | MPLS LABEL | OUTPUT NIF ID | OUTPUT PORT ID | FLOW ID | SOURCE MAC ADDRESS | DESTINATION MAC ADDRESS | COPY FLAG |
|---|---|---|---|---|---|---|---|
| VID #1 | LABEL #1 | NIF #5 | PORT #0 | FLOW ID #1 | MAC #10N05 | MAC #10A | 0: OFF |
| VID #2 | LABEL #2 | NIF #1 | PORT #1 | FLOW ID #2 | MAC #10N01 | MAC #10C | 1: ON |
| ... | ... | ... | ... | ... | ... | ... | ... |

HEADER PROCESSING TABLE 20

| MPLS LABEL | VLAN ID | OUTPUT NIF ID | OUTPUT PORT ID | FLOW ID | SOURCE MAC ADDRESS | DESTINATION MAC ADDRESS |
|---|---|---|---|---|---|---|
| LABEL #1 | VID #1 | NIF #5 | PORT #9 | FLOW ID #1 | MAC #10N09 | MAC #701 |
| LABEL #2 | VID #2 | NIF #1 | PORT #3 | FLOW ID #2 | MAC #10N03 | MAC #70n |
| ... | ... | ... | ... | ... | ... | ... |

INPUT FRAME BUFFER 136

| ADDRESS | ROUTE 0 RECEIVE BIT | ROUTE 1 RECEIVE BIT | FRAME DATA |
|---|---|---|---|
| 0 | 1 | 1 | DATA 0 |
| 1 | 1 | 1 | DATA 1 |
| 2 | 1 | 1 | DATA 2 |
| 3 | 0 | 0 | DATA 3 |
| 4 | 1 | 1 | DATA 4 |
| 5 | 0 | 0 | DATA 5 |
| 6 | 1 | 0 | DATA 6 |
| 7 | 0 | 0 | DATA 7 |
| ⋮ | ⋮ | ⋮ | ⋮ |

WAITING TIME HOLDING TABLE 21

| FLOW ID | DELAY DIFFERENCE BETWEEN BOTH ROUTES Ddif |
|---------|-------------------------------------------|
| 0 | Ddif 0 |
| 1 | Ddif 1 |
| 2 | Ddif 2 |
| 3 | Ddif 3 |
| ⋮ | ⋮ |

COPYING TABLE 22

| FLOW ID | MPLS LABEL | OUTPUT NIF ID | OUTPUT PORT ID | SOURCE MAC ADDRESS | DESTINATION MAC ADDRESS |
|---|---|---|---|---|---|
| FLOW ID #1 | — | NIF #5 | — | — | — |
| FLOW ID #2 | LABEL #2 | NIF #1 | PORT #2 | MAC #10N02 | MAC #10E |
| ⋮ | ⋮ | ⋮ | ⋮ | ⋮ | ⋮ |
| 221 | 222 | 223 | 224 | 225 | 226 |

FIG. 20

SENDING SN TABLE 23

| FLOW ID | SEND SEQUENCE NO. |
|---------|-------------------|
| FLOW ID #1 | SN1 |
| FLOW ID #2 | SN2 |
| ⋮ | ⋮ |

WAITING TIME HOLDING TABLE 21

| FLOW ID | DELAY DIFFERENCE BETWEEN BOTH ROUTES Ddif | CALCULATION MODE Mode | PRECEDING SEQUENCE NUMBER SNpre | PRECEDING ARRIVAL TIME Tpre | FRAME INTERVAL IFG | TIME COUNTER LAP COUNT TLap |
|---|---|---|---|---|---|---|
| 0 | Ddif0 | 0: AVERAGE | SNpre0 | Tpre0 | IFG0 | 1 |
| 1 | Ddif1 | 1: MAX. | SNpre1 | Tpre1 | IFG1 | 0 |
| 2 | Ddif2 | 1: MAX. | SNpre2 | Tpre2 | IFG2 | 2 |
| 3 | Ddif3 | 0: AVERAGE | SNpre3 | Tpre3 | IFG3 | 1 |
| ... | ... | ... | ... | ... | ... | ... |
| 211 | 212 | 213 | 214 | 215 | 216 | 217 |

US 8,457,012 B2

PACKET TRANSFER APPARATUS AND PACKET TRANSFER METHOD

CLAIM OF PRIORITY

The present application claims priority from Japanese application JP 2007-182971 filed on Jul. 12, 2007, the content of which is hereby incorporated by reference into this application.

FIELD OF THE INVENTION

The technique disclosed in this specification relates to a packet transfer apparatus, more particularly to a packet transfer apparatus and a system provided with a protection switching function, respectively and connected to each other through a plurality of links.

BACKGROUND OF THE INVENTION

The Japanese government, which had shown "e-Japan strategy" and "e-Japan priority plans" previously, has now presented a goal to formation of a high-grade information communication network society and concrete policies required to achieve the goal with priority. One of the subject matters to achieve the great plans is fusion of broadcasting and communications. If the broadcasting that has accumulated a variety of abundant programs and contents and computer networks that have been improved rapidly in convenience and serviceability are fused into one, new network services will be born. Such expectations have been increasingly built up in recent years.

A streaming technique is one of the techniques that have been most expected to realize such broadcasting services on the existing networks. In case of a streaming service, it is required to reproduce frames at specified times, respectively, so that the data including the one to be reproduced several seconds later are held in an application buffer. If this buffer does not store data enough to be reproduced consecutively, the reproduction is suspended until a certain amount of data are accumulated in the buffer. Consequently, the quality of broadcasting services comes to be affected significantly by delays and jittering of the communication, as well as frame losses. Preventing such frame losses has thus been considered to be most important in those broadcasting services.

The current IP (Internet Protocol) network prevents such frame losses through the retransmission control by the TCP (Transport Control Protocol), which is an upper layer protocol. However, the retransmission control might cause communication delays to increase. This is why the retransmission control cannot apply to such services as broadcasting services that do not allow significant delays. And under such circumstances, the UDP (User Datagram Protocol) is used as an upper layer protocol for transferring broadcasting service data. The UDP does not have any function to prevent frame losses as described above, however. A protection switching function is effective to duplicate the communication route, thereby preventing such frame losses. Particularly, the 1+1 protection switching function that enables a copy of each frame to be sent from a sender apparatus to a plurality of routes, those frames and their copies to be selected at and transferred from the receiver apparatus is the most effective means to prevent the frame losses as described above.

In case of the 1+1 protection switching function, the sender apparatus adds a sequence number to each frame and copies the frame, then sends out those frames and their copies into a plurality of communication routes. A frame and its copy are given a same sequence number. On the other hand, the receiver apparatus checks the sequence number of each frame received from the plurality of communication routes and selects and transfers only normal frames.

In case of the technique disclosed in JP-A No. 2006-100900, the sender apparatus sends VoIP (Voice over IP) frames to a plurality of routes. And the receiver apparatus stores the frames received from the plurality of routes in a frame buffer of which addresses are assigned so as to correspond to the sequence numbers of those frames, respectively. The receiver apparatus then reads those frames from the frame buffer in the order of sequence numbers, thereby transferring the frames in the order of sequence numbers. Consequently, frame missing and frame disordering are prevented without requiring any complicated processings such as frame sorting in the buffer.

SUMMARY OF THE INVENTION

In case of each of the conventional 1+1 protection switching functions including the one disclosed in JP-A No. 2006-100900, it is premised that subject services handle only the frames that are fixed in sending cycle and frame length just like those of the VoIP and TDM (Time Division Multiplex) emulation. Consequently, even when a plurality of logic flows are multiplexed, it is possible to assign a time slot to each logic flow and read frames from the frame buffer periodically.

However, as described above, in case of broadcasting services, it is premised that subject data including the one to be reproduced several seconds later are held in an application buffer beforehand, so that the frame traffic comes to have burst characteristics and frames do not arrive periodically. Furthermore, the frames are variable in length. Consequently, if a plurality of flows are multiplexed, a time slot cannot be assigned to each flow. This is because the timing must be adjusted to the maximum frame length at the time of time slot assignment to each variable length frame and in such a situation, it is impossible to utilize the bandwidth of the subject communication line sufficiently, and furthermore the number of logic flows to be multiplexed comes to be limited by the bandwidth of the subject communication line. And if those logic flows are multiplexed up to the upper limit of the subject bandwidth, assignment of the timing to the maximum frame length cannot catch up with the transfer speed of frames that arrive like bursts, thereby buffer overflows might often occur.

This is why frames are required to be read irregularly from the buffer in such a case. In other words, frames are required to be kept read from the buffer as long as there are any frames stored in the buffer. In addition, frames are required to be transferred in the order of sequence numbers, so that if one frame loss occurs in one communication route (e.g., the communication route 0), even when the next frame is received normally and stored in the buffer, the receiver apparatus is required to wait for the arrival of a frame having the same sequence number from the other communication route (e.g., the communication route 1).

Concretely, for example, there is a conceivable case in which a frame having a sequence number (SN):2 to be received from the communication route 0 is lost and the receiver apparatus receives the next SN:3 frame. In this case, at the time of receiving the SN:3 frame from the communication route 0, the receiver apparatus does not receive the SN:2 frame from the communication route 1 yet due to the transfer delay difference between the communication routes 0 and 1. Consequently, the receiver apparatus is required to wait for the transfer of the SN:3 frame until receiving the SN:2 frame from the communication route 1. However, if the SN:2 frame is also lost in the communication route 1, the receiver apparatus cannot receive the frame from any of the routes 0 and 1. As a result, the very transfer of the SN:3 frame stored in the buffer is disabled at this time.

In order to avoid such a problem, there is a conceivable case in which when the receiver apparatus receives the SN:3 frame from both of the communication routes 0 and 1, it is determined that the SN:2 frame is lost in both of the communication routes 0 and 1 and the sender apparatus is enabled to send the SN:3 frame. In this case, it is premised that no frame disordering has occurred in each communication route. Actually, in case of a highly reliable network provided with the 1+1 protection switching function, the network is easily prevented from occurrence of frame disordering in a same flow and the network is built up such way as a matter of course. In case of the above controlling method, however, for example, if the receiver apparatus cannot receive the SN:3 and its subsequent frames from the communication route 1 due to a line trouble that has occurred in the communication route 1, the transfer apparatus is disabled to transfer any frames even when receiving those frames from the normal communication route 0. This has been a problem. And this makes the execution of the 1+1 protection switching function meaningless.

Under such circumstances, it is a typical object of the present invention disclosed in this specification to provide a data transfer apparatus comprising a plurality of interfaces connected to one or more communication routes; a buffer that stores data temporarily; and a buffer controller that controls the buffer. The plurality of interfaces include a first interface and a second interface and the plurality of communication routes include a first communication route connected to the first interface and a second communication route connected to the second interface. The first and second interfaces receive sequentially numbered data from the first and second communication routes, respectively. If the data transfer apparatus receives sequentially numbered second data from the first communication route before receiving sequentially numbered first data, the buffer controller stores the received second data in the buffer. And when the data transfer apparatus receives the first sequentially numbered data from the second communication route, the buffer controller stores the received first data in the buffer, read the first and second data from the buffer in the order of their sequence numbers, and sends to one of the plurality of interfaces. If the data transfer apparatus receives the second sequentially numbered data from the second communication route before receiving the first sequentially numbered data, the buffer controller reads the second data from the buffer and sends to one of the plurality of interfaces. Then, the buffer controller checks whether or not a predetermined waiting time has expired. If the predetermined waiting time has already expired, the buffer controller reads the second data from the buffer and sends to one of the plurality of interfaces.

According to an aspect of the present invention, because a 1+1 protection switching function is executed for such services as broadcasting services of which variable-length frames arrive irregularly, frame losses can be prevented, thereby providing users with high quality services.

BRIEF DESCRIPTION OF THE DRAWINGS

FIG. 7 is a format of a header processing table in the first embodiment of the present invention;

FIG. 12 is a configuration of an input frame buffer in the first embodiment of the present invention;

FIG. 17 is a configuration of a waiting time holding table in the first embodiment of the present invention;

FIG. 19 is a configuration of a copying table in the first embodiment of the present invention;

FIG. 20 is a configuration of a sending SN table in the first embodiment of the present invention;

FIG. 27 is a configuration of the waiting time holding table in the second embodiment of the present invention;

DETAILED DESCRIPTION OF THE PREFERRED EMBODIMENTS

Hereunder, there will be described the preferred embodiments of the present invention with reference to the accompanying drawings.

Figure 1:
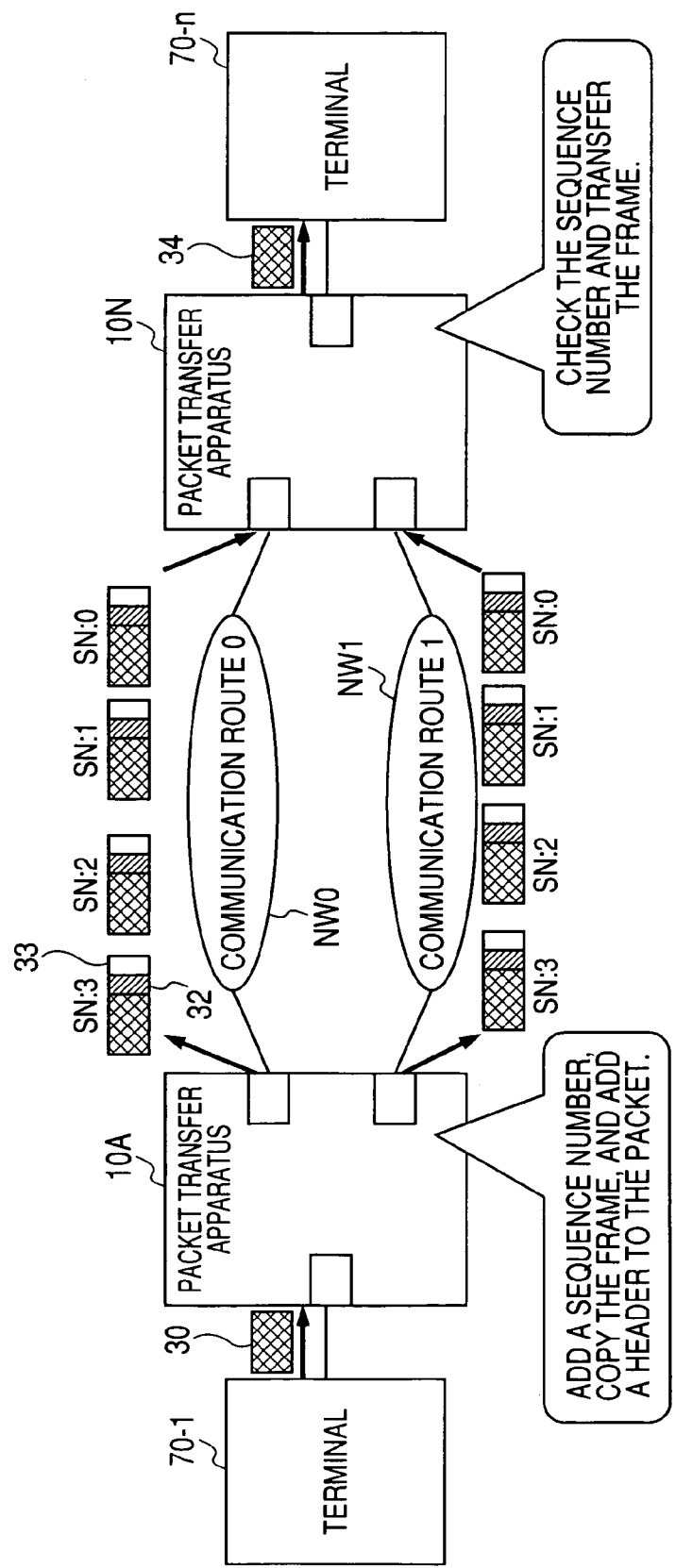
FIG. 1 is a block diagram of a communication network to which a packet transfer apparatus in a first embodiment of the present invention applies.

FIG. 1 shows a block diagram of a communication network to which a packet transfer apparatus in a first embodiment of the present invention is applied.

In FIG. 1, a packet transfer apparatus 10A is connected to another packet transfer apparatus 10N through two or more communication routes. (e.g., a communication route 0 NW0 and a communication route 1 NW1). These communication routes 0 NW0 and 1 NW1 may be physical lines or networks composed of one or more packet transfer apparatuses, respectively. Furthermore, the packet transfer apparatus 10A is connected to a terminal 70-1.

The packet transfer apparatus 10A, disposed between the packet transfer apparatus 10N and the terminal 70-1, intermediates the transfer of frames between them. In the other words, the packet transfer apparatus 10A receives frames and processes the received frames as needed, and sends those received and processed frames to the terminal 70-1 and the packet transfer apparatus 10N. More concretely, when the terminal 70-1 outputs a frame 30 to the packet transfer apparatus 10A, the packet transfer apparatus 10A adds a sequence number 32 to the frame 30. The sequence number 32 represents the ordering information of frames to be sent. The packet transfer apparatus 10A then copies the frame 30 and sends the frame 30 and its copy to the communication routes 0 NW0 and 1 NW1, respectively.

Specific fixed addresses are set for the interfaces of the packet transfer apparatuses 10A and 10N, respectively. Those apparatuses 10A and 10N are connected to the communication routes 0 NW0 and 1 NW1, respectively. The packet transfer apparatus 10A, upon sending the frame 30 to each communication route 0/1, adds a header 33 that includes a destination address to the frame 30 so that the frame 30 arrives at the interface of the receiving side packet transfer apparatus 10N corresponding to each communication route.

The opposite packet transfer apparatus 10N monitors the frames having the sequence number 32 among those to be received from a plurality of communication routes for sequence number loss and disordering, then transfers the frame 34 in the order of sequence numbers to the terminal 70-n. The frame 34 is generated as follows; the packet transfer apparatus 10N, upon receiving the frame 32, deletes the unnecessary sequence number 32 and header 33 from the received frame, thereby generating the frame 34.

While frames are flown from the terminal 70-1 to the terminal 70-n here as described above, frames are also flown in the reverse direction similarly. In other words, the packet transfer apparatus 10A and the packet transfer apparatus 10N are completely the same in configuration.

The packet transfer apparatuses 10A and 10N may also transfer Ethernet (registered trademark) frames that include an IP (Internet Protocol) packet as a payload, respectively. The present invention can apply to any data transfer apparatuses capable of transferring data in any formats.

Figure 2:
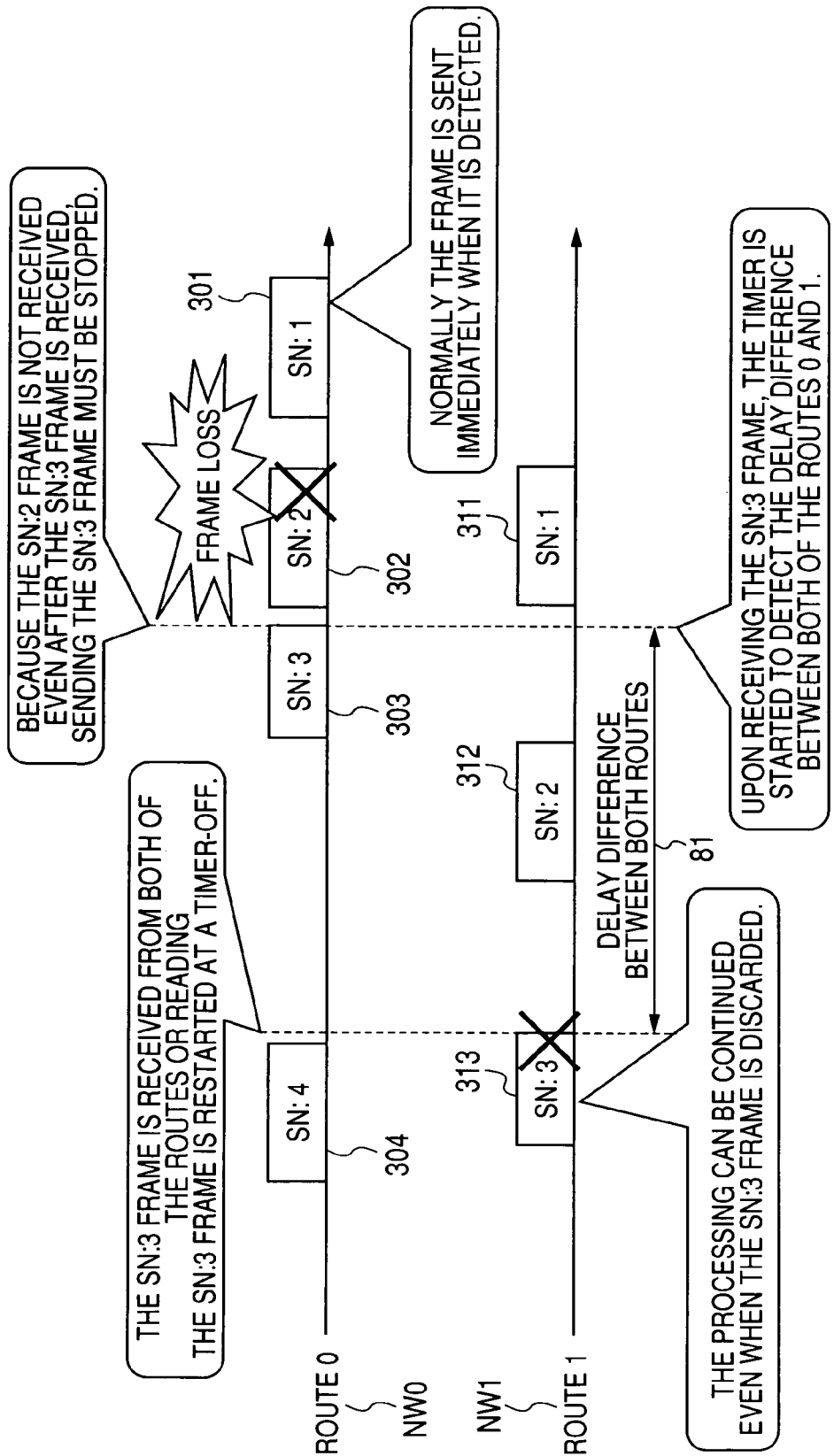
FIG. 2 is a diagram illustrating an outline of an operation of the packet transfer apparatus in the first embodiment of the present invention.

FIG. 2 shows a diagram illustrating an outline of an operation of the packet transfer apparatus 10N in the first embodiment of the present invention.

Concretely, FIG. 2 shows an example of a timing at which the packet transfer apparatus 10N receives frames from the communication routes 0 NW0 and 1 NW1 and an example of a processing of the packet transfer apparatus 10N, executed upon receiving those frames. In each example shown in FIG. 2, two horizontal axes correspond to two communication routes. Each of those horizontal axes shows a timing at which the packet transfer apparatus 10N receives frames through each communication route. It denotes that the father frames are displayed toward the right side, the earlier they are received.

The packet transfer apparatus 10N receives frames from two communication routes, that is, from the communication routes 0 NW0 and 1 NW1, respectively. A sequence number (SN) is added to each frame to be received. The sequence number (SN) represents an order of frame sending. If a same sequence number is given to some frames, those frames include at least a same payload 405 (refer to FIG. 3). In the description to be made below, if some frames include a same content, it means that those frames include at least a same payload 405. The packet transfer apparatus 10N stores received frames once in the buffer (refer to FIG. 5). And if there is even one frame in the buffer, the packet transfer apparatus 10N reads the frame from the buffer immediately and transfers the read frame to the terminal 70-n. At this time, the packet transfer apparatus 10N keeps checking sequence numbers for missing and disordering, thereby transferring frames in the order of their sequence numbers.

In the example shown in FIG. 2, the packet transfer apparatus 10A sends out frames of which sequence numbers are from (SN):1 to SN:4 sequentially.

In the example shown in FIG. 2, the transfer delay of the communication route 0 NW0 is smaller than that of the communication route 1 NW1. Consequently, the frames transferred through the communication route 0 NW0 always arrive in the packet transfer apparatus 10N earlier than the frames transferred through the communication route 1 NW1 even when the contents are the same between those frames transferred through those two communication routes. The packet transfer apparatus 10N, upon receiving frames from the communication route 0 NW0, usually stores those frames in the buffer, then sends those frames out immediately to the destination.

In the example shown in FIG. 2, the packet transfer apparatus 10N receives the frame 301 of SN:1 from the communication route 0 NW0 first. In this case, the packet transfer apparatus 10N stores the received frame 301 in the buffer, then sends the frame 301 to the terminal 70-n. At this time, the packet transfer apparatus 10N, as described with reference to FIG. 1, deletes the sequence number 32 and header 33 from the frame 301 to be sent to the terminal 70-n.

After that, the packet transfer apparatus 10N receives the frame 311 of SN:1 from the communication route 1 NW1. If the frame 301 is already sent out at this time, the packet transfer apparatus 10N never sends the frame 311 to the terminal 70-n.

The packet transfer apparatus 10N, if there occurs no frame loss, is scheduled to receive the SN:2 frame 302 after receiving the SN:1 frame 301. In the example shown in FIG. 2, however, the frame 302 is lost. In this case, the packet transfer apparatus 10N receives the SN:2 frame 312 from the communication route 1 NW1 and stores the frame 312 in the buffer, then sends the frame 312 to the terminal 70-*n*.

In some cases, however, the packet transfer apparatus 10N happens to receive the SN:3 frame 303 from the communication route 0 NW0 before receiving the frame 312 due to the transfer delay difference between the communication routes 0 NW0 and 1 NW1. In this case, the packet transfer apparatus 10N, although it has already received the SN:3 frame 303, is required to wait for the SN:2 frame 312 that is expected to arrive from the communication route 1 NW1. In other words, the packet transfer apparatus 10N stores the received frame 303 in the buffer, but cannot send the frame 303 before receiving and completing of sending the frame 312 to the terminal 70-*n*. Consequently, if the frame 312 is also lost at this time, the packet transfer apparatus 10N is disabled to send the frame 303, which is already received normally.

In each communication route 0 NW0/1 NW1, therefore, no frame disordering occurrence will be a conceivable case. In this case, upon receiving the frames 303 and 313 having the sequence number SN:3 from both of the communication routes 0 NW0 and 1 NW1 before receiving the frames 302 and 312 having the sequence number SN:2, the packet transfer apparatus 10N determines the loss of the frames 302 and 312 in both of the communication routes 0 NW0 and 1 NW1, thereby the packet transfer apparatus 10N is enabled to send the frame 303 or 313 having the sequence number SN:3 to the terminal 70-*n*.

According to the controlling method as described above, if the SN:3 frame 313 and its subsequent frames are further lost in the communication route 1 NW1 due to a trouble in the communication route, the packet transfer apparatus 10N cannot send the SN:3 frame 303 received normally from the communication route 0 NW0 and furthermore, the packet transfer apparatus 10N comes to be disabled to send any of the subsequent received frames to the destination.

In order to avoid such a trouble, therefore, the packet transfer apparatus 10N in this embodiment, upon detecting a loss of any sequence number due to a frame loss as described above, stops the frame sending temporarily. At this time, the packet transfer apparatus 10N sets the transfer delay difference between both of the routes 0 NW0 and 1 NW1 for the timer (refer to FIG. 8) and starts the timer count-down. In other words, when the count-down begins, the value set for the timer is reduced with time and becomes '0' finally. And when this timer value becomes '0', when the packet transfer apparatus 10N receives the SN:2 frame, or when the packet transfer apparatus 10N receives the SN:3 frame from both of the routes 0 NW0 and 1 NW1, the packet transfer apparatus 10N restarts the frame sending.

As a result, if the SN:3 frame 313 is lost in the communication route 1 NW1 as shown in FIG. 2, and even if a line error occurs in one of the communication routes 0 NW0 and 1 NW1, the frame sending is not stopped completely, thereby frame losing is prevented.

In the description to be made below, if a frame is lost (if the packet transfer apparatus 10N cannot receive the frame), it is conceivable that the frame has arrived normally at the packet transfer apparatus 10N, but it is not received correctly by the apparatus 10N due to an error detected in the frame FCS 406 or 417 (refer to FIGS. 3 and 4) as a result of an error check. In this case, the frame is discarded. Thus the packet transfer apparatus 10N cannot transfer the received frame.

Figure 3:
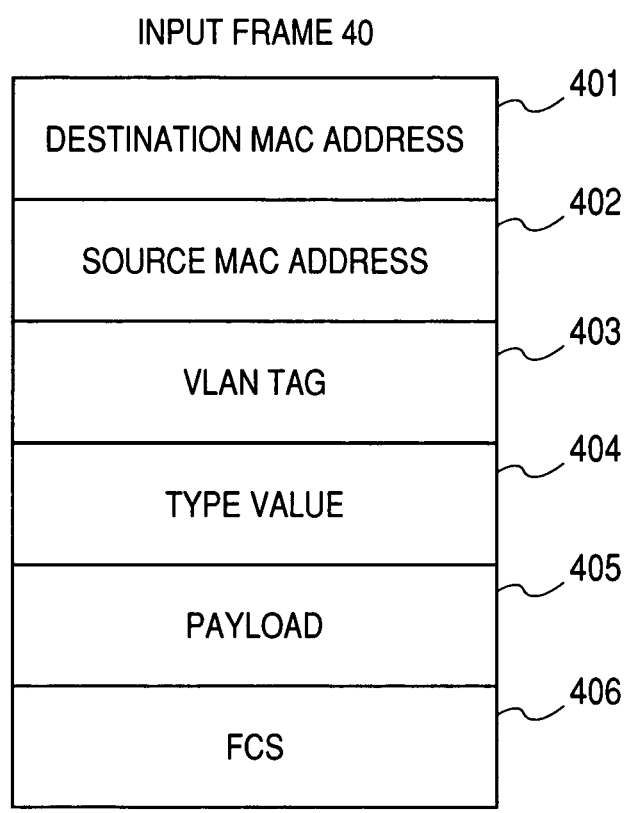
FIG. 3 is a format of the frames used for the communication between a terminal and the packet transfer apparatus in the first embodiment of the present invention.

FIG. 3 shows a format of the frame 40 used in the communication between the terminal 70 and the packet transfer apparatus 10A/10N.

In other words, the frame 40 is equivalent to each of the frames 30 and 34 shown in FIG. 1.

The frame 40 includes fields of destination MAC address 401, source MAC address 402, VLAN tag 403, type value 404, payload 405, and frame check sequence (FCS) 406.

Figure 5:
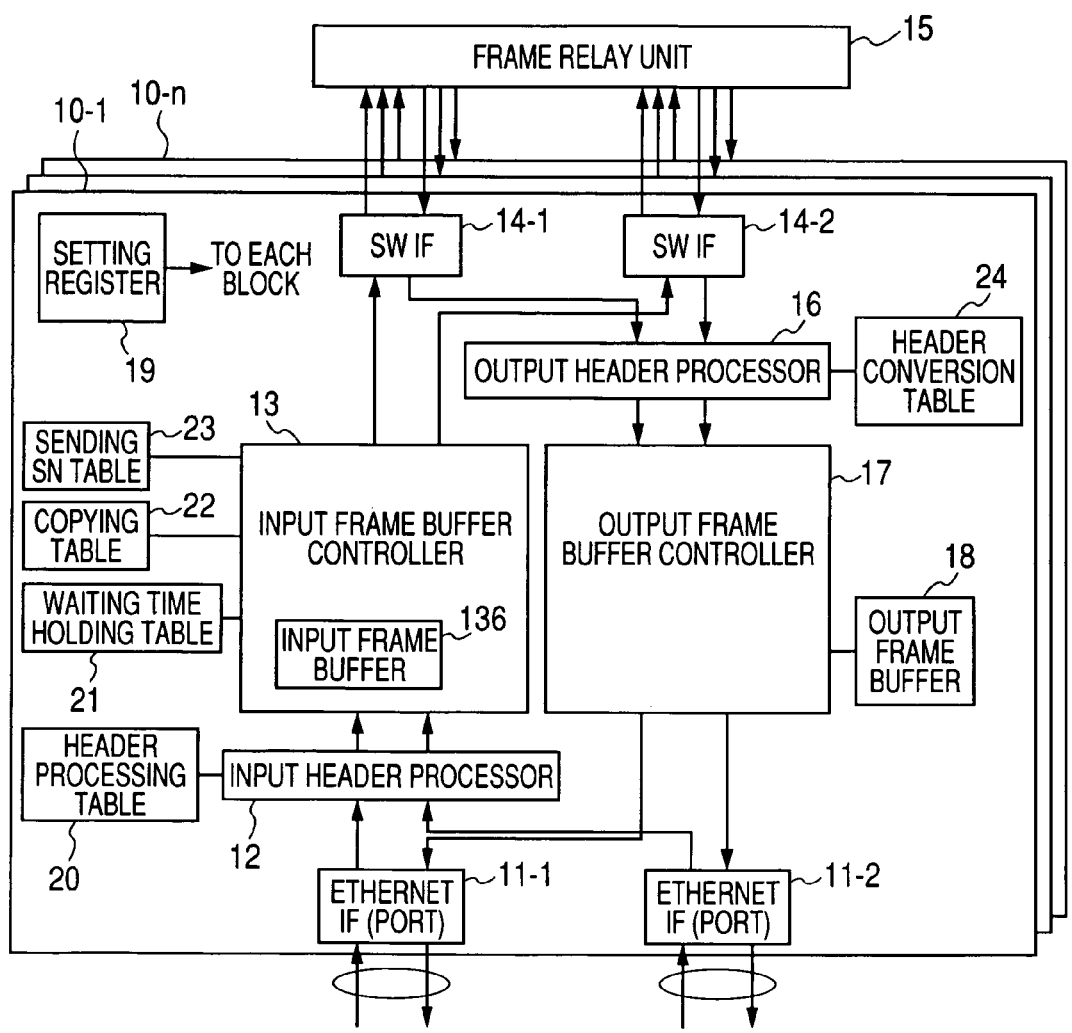
FIG. 5 is a block diagram of the packet transfer apparatus in the first embodiment of the present invention.

In the field of destination MAC address 401 is set the packet transfer apparatus 10A, which is the destination of the frame 40, as well as the MAC address of the interface of the packet transfer apparatus 10A or terminal 70 (e.g., an input/output line interface 11 shown in FIG. 5).

In the field of source MAC address 402 are set the packet transfer apparatus 10A, which is the source of the frame 40, as well as the MAC address of the interface of the packet transfer apparatus 10N or terminal 70.

The VLAN tag 403 denotes the value of the VLAN ID (VID#) to be assumed as a flow identifier.

The type value 404 denotes the type of the subsequent header.

The fields from the destination MAC address 401 to the type value 404 are combined to form a MAC header.

The payload 405 is data (payload) to be carried by the frame 40. The payload 405 may store an upper-order protocol packet (e.g., IP packet).

The FCS 406 is a check code used to detect frame error existence. The receiving side packet transfer apparatus 10N, etc. check this FCS 406 of each received frame. If an error is detected in the check, the packet transfer apparatus 10N, etc. discard the received frame. In other words, the frame is determined as a lost one.

Figure 4:
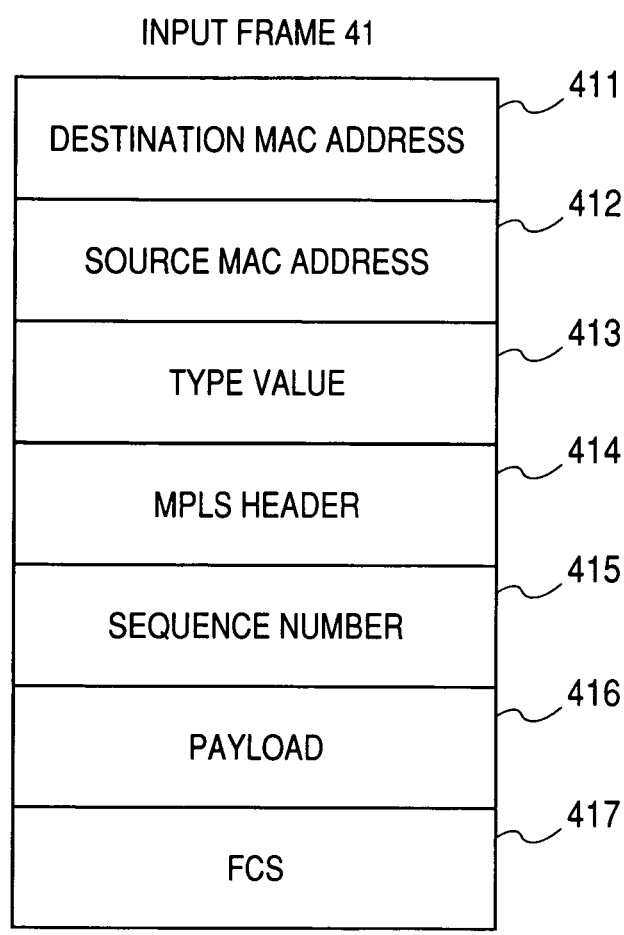
FIG. 4 is a format of the frames used in the communication in a communication route in the first embodiment of the present invention.

FIG. 4 is a format of the frame 41 used for the communication in the communication routes 0 NW0 and 1 NW1 in the first embodiment of the present invention.

The frame 41 is equivalent to each frame transferred from the packet transfer apparatus 10A to the packet transfer apparatus 10N in the example shown in FIG. 1.

The frame 41 consists of fields of destination MAC address 411, source MAC address 412, type value 413, MPLS header 414, sequence number 415, payload 416, and frame check sequence (FCS) 417.

In the field of destination MAC address 411 is set the MAC address of the interface of the packet transfer apparatus (packet transfer apparatus 10A in the example shown in FIG. 1), which is the destination of the frame 41.

In the field of source MAC address 412 is set the MAC address of the interface of the packet transfer apparatus (packet transfer apparatus 10N in the example shown in FIG. 1), which is the source of the frame 41.

The type value 413 denotes the type of the subsequent header.

The fields from the destination MAC address 411 to the type value 413 are combined to form a MAC header.

The MPLS header 414 denotes a value (label #) of the label assumed as a flow identifier.

In the field of sequence number 415 is set consecutive integers denoting the frame sending order in each flow. The smaller the sequence number 415 is, the earlier the subject frame is sent out from the source.

In the field of payload 416 is stored the frame 40 received from the terminal 70 as is.

The frame check sequence (FCS) 417 is a check code used to detect error existence in the frame 41. The FCS 417 is checked by the packet transfer apparatus 10N, etc. at the receiving side.

FIG. 5 shows a block diagram of the packet transfer apparatus 10N in the first embodiment of the present invention.

The packet transfer apparatus 10A and the packet transfer apparatus 10N are the same in configuration, so that the description of the configuration of the packet transfer apparatus 10A will be omitted here.

The packet transfer apparatus 10N includes a plurality of network interface boards (NIF) 10-1 to 10-n and a frame switching block 15 connected to those interface boards. Hereunder, there will be described those interface boards NIF 10-1 to 10-n that will be described as NIF 10 generically in common descriptions for them.

The NIF 10 includes a plurality of input/output line interfaces 11-1 to 11-2 that function as communication ports, respectively. The NIF 10 is connected to the terminal 70 through the communication route 0 NW0 or 1 NW1. Hereunder, those input/output line interfaces 11-1 and 11-2 will be described as the input/output line interface 11 generically in the common description for them. Although two input/output line interfaces 11 are shown in FIG. 5, the NIF 10 may include many more input/output line interfaces 11. The input/output line interface 11 in this first embodiment is an Ethernet (registered trademark) line interface.

The NIF 10 includes an input header processor 12 connected to the input/output line interface 11 and an input frame buffer controller 13 connected to the input header processor 12. Furthermore, the NIF 10 includes a plurality of switch (SW) interfaces 14-1 to 14-2 connected to the frame switching block 15, an output header processor 16 connected to those SW interfaces 14-1 and 14-2, and an output frame buffer controller 17 connected to the output header processor 16. Hereunder, the SW interfaces 14-1 and 14-2 will be described generically as the SW interface 14 in the common descriptions for them. Although two SW interfaces 14 are shown in FIG. 5, the NIF 10 may also include many more SW interfaces 14.

The SW interface 14-i corresponds to the input/output line interface 11-i. Input frames received by the input/output line interface 11-i are transferred to the frame switching block 15 through the SW interface 14-i. The output frame dispatched from the frame switching block 15 to the SW interface 14-i are sent to an output line through the input/output line interface 11-i.

In the example shown in FIG. 5, "i" is 1 or 2. For example, input frames received by the input/output line interface 11-1 are transferred to the frame switching block 15 through the SW interface 14-1. The output frames dispatched from the frame switching block 15 to the SW interface 14-1 are sent to an output line through the input/output line interface 11-1. On the other hand, the input frames received by the input/output line interface 11-2 are transferred to the frame switching block 15 through the SW interface 14-2. The output frames dispatched from the frame switching block 15 to the SW interface 14-2 are sent to an output line through the input/output line interface 11-2. Such way, the SW interface 14 and the input/output line interface 11 is related to each other at one-to-one correspondence.

If frames sent from the terminal 70-1 arrive at the terminal 70-n through the packet transfer apparatuses 10A and 10N sequentially as shown in the example in FIG. 1, the output line connected to the packet transfer apparatus 10A is assumed as the communication route 0 NW0. The output line connected to the packet transfer apparatus 10N is a line led to the terminal 70-n.

For example, the packet transfer apparatus 10A shown in FIG. 1 includes at least three input/output line interfaces 11 and one of those interfaces 11 is connected to the terminal 70-1, another is connected to the communication route 0 NW0, and still another is connected to the communication route 1 NW1. The input/output line interface 11 connected to the terminal 70-1 belongs to the NIF 10, which is different from the NIF 10 of the two input/output line interfaces connected to the two communication routes 0 NW0 and 1 NW1.

Consequently, frames received by the packet transfer apparatus 10A from the terminal 70-1 are received by one NIF 10 and transferred from the NIF 10 to another NIF 10 connected to the two communication routes 0 NW0 and 1 NW1 through the frame switching block 15. The transferred frames are then sent from the input/output line interface of the NIF 10 connected to the two communication routes 0 NW0 and 1 NW1 to those two communication routes 0 NW0 and 1 NW1.

Figure 6:
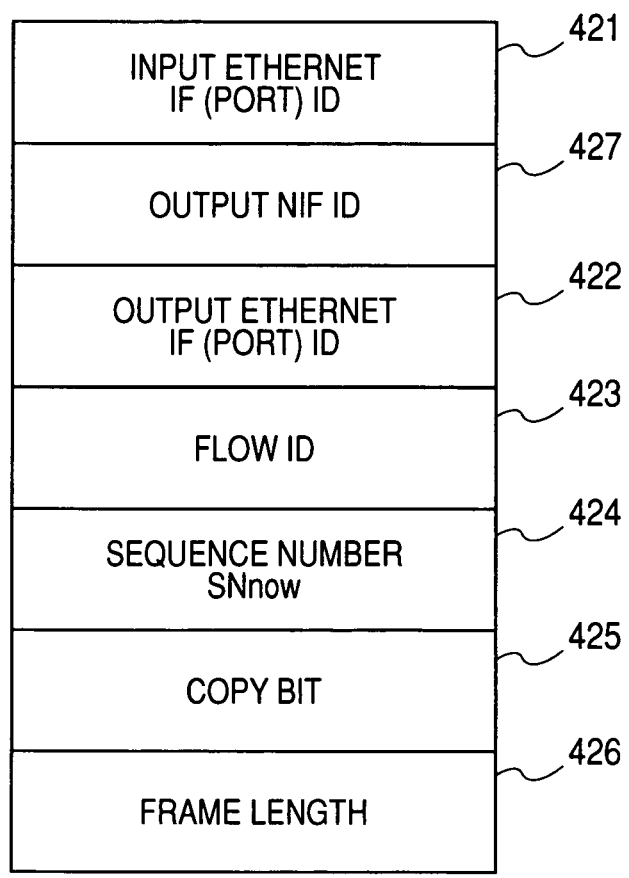
FIG. 6 is a format of an inner header added by an input/output line interface in the first embodiment of the present invention.

The input/output line interface 11-i, upon receiving the frame 40 or 41 from an input line, adds an inner header 42 as shown in FIG. 6 to the received frame.

In the example shown in FIG. 1, the input line connected to the packet transfer apparatus 10A is used to pass the frame 30 sent from the terminal 70-1. The input line connected to the packet transfer apparatus 10N is the communication route 0 NW0.

The NIF 10 further includes an output frame buffer 18, a setting register 19, a header processing table 20, a waiting time holding table 21, a copying table 22, a send sequence number (SN) table 23, and a header conversion table 24. The input frame buffer controller 13 includes an input frame buffer 136. The setting register 19 and each buffer may be predetermined areas secured in the storage area provided in the NIF 10. Each table may also be held in a predetermined area secured in the storage area provided in the NIF 10. The setting register 19 and each table will be described later.

FIG. 6 shows a configuration of the inner header 42 added by the input/output line interface 11 in the first embodiment of the present invention.

The inner header 42 consists of fields of input port ID 421, output network interface board identifier (NIF ID) 427, output port ID 422, flow ID 423, sequence number SNnow 424, copy bit 425, and frame length 426. Of those fields, the output NIF ID 427 and the output port ID 422 are used as inner routing information. The frame switching block 15 transfers input frames to a specified SW interface 14 of a specified NIF 10 according to those inner routing information.

When the input/output line interface 11-i adds an inner header 42 to an input frame, the fields of output NIF ID 427, output port ID 422, flow ID 423, sequence number SNnow 424, and copy bit 425 are still blank. In those fields are set valid values by the input header processor 12.

The input header processor 12 sets necessary values in the fields of output NIF ID 427, output port ID 422, flow ID 423, copy bit 425 in the inner header 42 of each input frame by referring to the header processing table 20 (FIG. 7). Furthermore, the input header processor 12 analyzes the MAC header of each input frame. And if a value is set in the field of sequence number 415 of the received frame, the processor 12 sets the value of the sequence number 415 in the field of sequence number NSnow 424.

FIG. 7 shows a configuration of the header processing table 20 in the first embodiment of the present invention.

The header processing table 20, as shown in FIGS. 7A and 7B, consists of two tables, that is, a header processing table 20A and a header processing table 20B.

The header processing table 20A includes table entries of MPLS label 202, output NIF ID 208, output ID 203, flow ID 204, source MAC address 205, destination MAC address 206, and copy flag 207. The value in the VLAN ID 201 is used as a search key to make searches in this table.

The source MAC address 205 is a MAC address added to an input/output line interface 11-i identified by the output port ID 203.

The destination MAC address 206 denotes the MAC address of a packet transfer apparatus assumed as a frame destination and connected through the above described input/output line interface 11-i.

The copy flag 207 denotes whether to send each input frame received from the terminal 70 to a plurality of routes (communication routes 0 NW0 and 1 NW1), that is, whether to make a copy of the frame. In the example shown in FIG. 7, the value '0' set in the copy flag 207 denotes that there is no need to make a copy from the frame and '1' denotes that a copy should be made from the frame.

The header processing table 20B includes table entries such as VLAN ID 201, output NIF ID 208, output port ID 203, flow ID 204, source MAC address 205, and destination MAC address 206. The value set in the field of MPLS label 202 is used as a search key to make searches in this table.

The source MAC address 205 denotes the MAC address added to an input/output line interface 11-i identified by the output port ID 203. It denotes the MAC address of a terminal assumed as the subject frame destination and connected through the above described input/output line interface 11-i.

If the frame 40 is received from the terminal 70 and it is formatted as shown in FIG. 3, the input frame processor 12 searches a table entry from the header processing table 20A. The table entry includes a field of VLAN ID 201 that stores a value of VID (VID#) denoted by the VLAN tag 403 of the input frame. Then, the input header processor 12 adds a header newly to the input frame 40. The header includes a value denoted by the searched table entry. As a result, the format of the input frame is converted as shown in FIG. 4. At this time, the inner header 42 added to the head of the input frame before the conversion is not converted; it is kept positioned as is. Concretely, the input header processor 12 sets the values of the MPLS label 202, source MAC address 205, and destination MAC address 206 denoted by the searched table entry, respectively in the fields of the MPLS header 414, source MAC address 412, and destination MAC address 411. At this time, the input frame buffer controller 13 sets a valid value in the field of sequence number 415, which has been blank.

Furthermore, the input header processor 12 sets the values of the output NIF ID 208, output port ID 203, flow ID 204, and copy flag 207 denoted by the table entry searched from the above header processing table 20A in the fields of output NIF ID 427, output port ID 422, flow ID 423, and copy flag 425 of the inner header 42, respectively. Then, the input header processor 12 transfers the inner header 42 added input frame to the input frame buffer controller 13.

If the frame 41 is received from the communication route 0 NW0 or 1 NW1 and it is formatted as shown in FIG. 4, the input header processor 12 searches a table entry from the header processing table 20B. The table entry includes the field of MPLS label 202 that stores a value of the MPLS (level #) denoted by the MPLS header 414 of the input frame. Then, the input header processor 12 rewrites the header of the input frame with the values denoted by the searched table entry. Concretely, the input header processor 12 sets the values of VLAN ID 201, source MAC address 205, and destination MAC address 206 denoted, respectively by the searched table entry in the fields of VLAN tag 403, source MAC address 402, and destination MAC address 401. As a result, the format of the input frame is converted as shown in FIG. 3.

Furthermore, the input header processor 12 adds the inner header 42 to the input frame formatted as shown in FIG. 3. Then, the input header processor 12 sets the values of output NIF ID 208, output port ID 203, flow ID 204, and copy flag 207 denoted by the table entry searched from the above header processing table 20B in the fields of output NIF ID 427, output port ID 422, flow ID 423, and copy bit 425 in the inner header 42, respectively. Furthermore, the input header processor 12 sets the value of the sequence number 415 of the received frame in the field of sequence number SNnow 424 of the inner header 42 and transfers the inner header 42 added input frame to the input frame buffer controller 13.

Next, a description will be made with reference to FIG. 5 again.

The input frame buffer controller 13, upon receiving a frame from the input header processor 12, stores the received frame in the input frame buffer 136 as an input frame according to the operation mode set in the setting register 19 set for each NIF 10. The operation mode set in the setting register 19 and the processing to be executed according to the operation mode will be described later with reference to FIG. 9. The input frame buffer controller 13 then reads the frames accumulated in the input frame buffer 136 according to the operation mode set in the setting register 19 and dispatches each of those frames to the SW interface 14 corresponding to the input port ID 421 denoted by the inner header of the frame itself.

The operation mode set in the setting register 19 depends on whether the input port of the subject NIF 10 (input/output line interface 11 that receives the subject frame) is connected to the terminal 70 or one of the communication routes 0 NW0 and 1 NW1. The input frame buffer controller 13 refers to the operation mode upon changing its processing.

If the input port is connected to the terminal 70, the "terminal connected mode" is set as the operation mode in the setting register 19. In this case, the input frame buffer controller 13 copies the input frame and sends the original input frame and its copy to a plurality of communication routes (0 NW0 and 1 NW1).

On the other hand, if the input port is connected to the communication route 0 NW0 or 1 NW1, "network connected mode" is set as the operation mode in the setting register 19. In this case, the input frame buffer controller 13 checks the sequence number of each input frame. Upon detecting a frame loss, the input frame buffer controller 13 stops the frame sending temporarily and waits for the arrival of the frame having the same content as that of the frame lost in one communication route from the other communication route. After that, upon detecting an event of "restart frame sending", the input frame buffer controller 13 restarts the frame sending, thereby restoring the normal operation. The details of the processing executed in each of the operation modes will be described later.

As shown in the example shown in FIG. 1, if a terminal 70-n receives a frame from the terminal 70-1 through the packet transfer apparatus 10A and communication route 0 NW0 or through the communication route 1 NW1 and packet transfer apparatus 10N sequentially, the frame is inputted to the input/output line interface 11 (assumed as an input port) of the NIF 10 connected to the terminal 70-1 among the plurality of NIFs 10 of the packet transfer apparatus 10A. Otherwise, the frame is inputted to the input/output line interface 11 (assumed as an input port) of the NIF 10 connected to the communication route 0 NW0 among the plurality of NIFs 10 of the packet transfer apparatus 10N.

The frame switching block 15 receives frames from the SW interfaces 14-1 to 14-2 of each GIN 10 and transfers those frames to a SW interface 14-i of the NIF 10 identified by the output NIF ID 427 and the output port ID 422 set in the inner header of each input frame.

Frames received by each SW interface 14 is transferred to the output header processor 16 sequentially. In this first embodiment, the input header processor 12 converts the format of each input frame to the format of each output frame by referring to the header processing table 20. However, instead of the input header processor 12, the output header processor 16 may refer to the header conversion table 24 to make the format conversion. In this case, the header conversion table 24 comes to hold information required for the header conversion (e.g., the same information as that held in the header processing table 20). In case where the input header processor 12 executes the format conversion, the output header processor 16 sends the frames received from the SW interface 14 to the output frame buffer controller 17 as are. The output frame buffer controller 17 then accumulates those received frames in the output frame buffer 18.

The output frame buffer controller 17 then reads those accumulated frames from the buffer 18 and transfers them to the input/output line interface 11 corresponding to the output port ID 422 set in the inner header 42 of each output frame. The input/output line interface 11 then removes the inner header 42 from each received frame and sends the frame formatted as shown in FIG. 3 or 4 to an output line.

Figure 8:
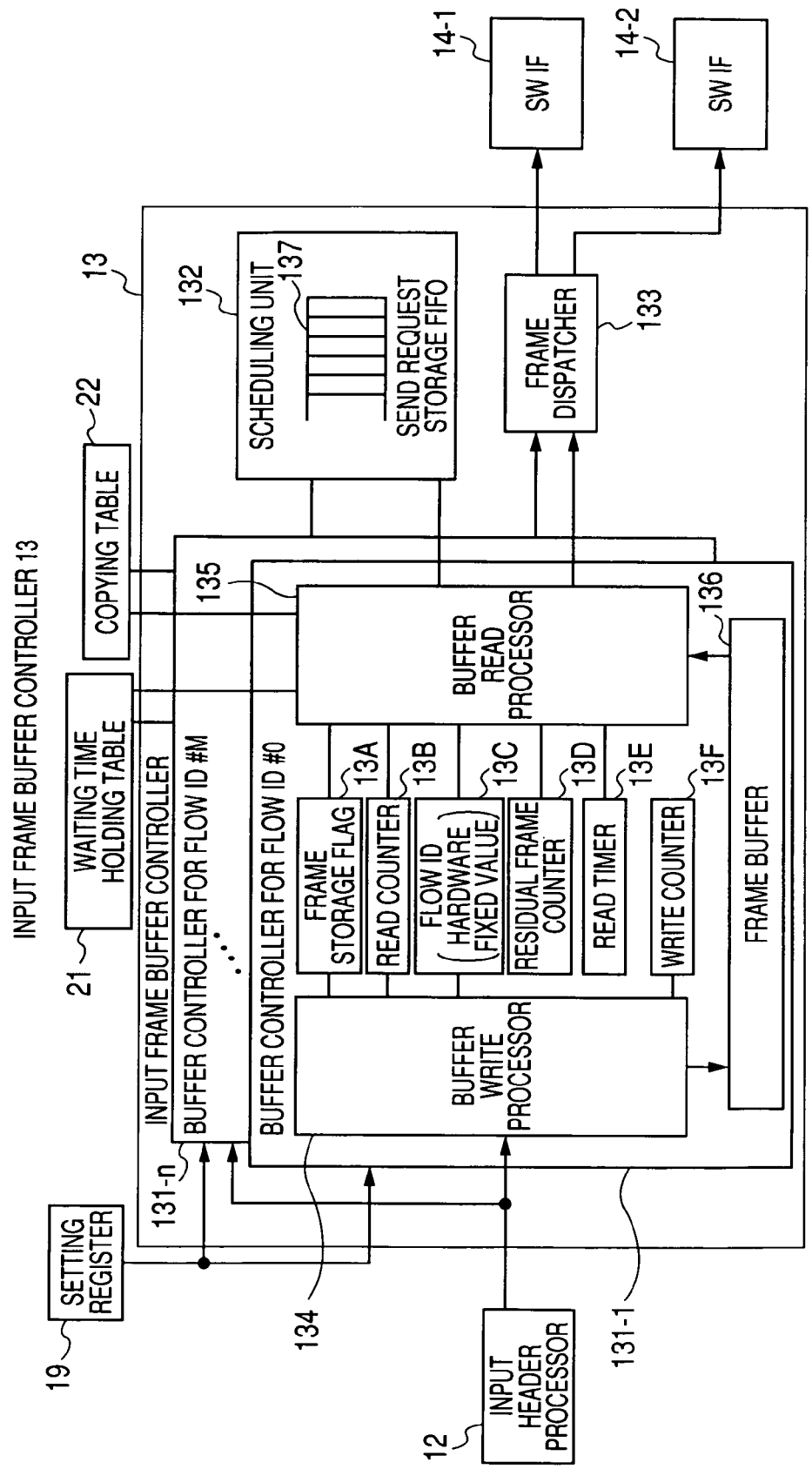
FIG. 8 is a block diagram of an input frame buffer controller in the first embodiment of the present invention.

FIG. 8 shows a block diagram of the input frame buffer controller 13 in the first embodiment of the present invention.

The input frame buffer controller 13 consists of buffer controllers 131-1 to 131-*n*, each corresponding to a flow ID, and a scheduling unit 132 connected to those buffer controllers 131-1 to 131-*n*, and a frame dispatcher 133 connected to the buffer controllers 131-1 to 131-*n*. Hereunder, those buffer controllers 131-1 to 131-*n* will be described as the buffer controller 131 generically in the common descriptions for them.

In the example shown in FIG. 1, it is premised that only one flow passes through the subject network to simplify the description. Actually, however, the network shown in FIG. 1 can process a plurality of flows. The input frame buffer controller 13 in this first embodiment, as shown in FIG. 8, includes a plurality of buffer controllers 131, each of which is allocated to a flow so as to cope with the processings of a plurality of flows as a whole. Each buffer controller 131 corresponding to a flow ID processes only the frames of the corresponding flow. For example, the buffer controller 131-1 corresponding to the flow ID#0 processes only the frames of the flow of which ID is '#0'. However, according to the present invention, one buffer controller 131 can cope with the processings of frames of a plurality of flows.

Each buffer controller 131 includes a buffer write processor 134, a buffer read processor 135, and an input frame buffer 136.

Furthermore, each buffer controller 131 holds fields of frame storage flag 13A, read counter 13B, flow ID 13C, residual frame counter 13D, read timer 13E, and write counter 13F. Those fields may also be held in a storage area provided in the packet transfer apparatus 10N, etc.

The frame storage flag 13A denotes whether or not a not-requested-yet frame is stored in the input frame buffer 136.

The read counter 13B holds a value to be used as a read address of the input frame buffer 136.

The flow ID 13C holds the identifier of a flow to be processed by each buffer controller 131. The value is fixed to the subject hardware. For example, the value in the flow ID field 13C held by the buffer controller 131-1 corresponding to the flow ID#0, which processes the flow identified by the flow ID '#0', is '#0'. The flow ID 13C may be held in a no-volatile memory area provided in the packet transfer apparatus 10N, etc.

The residual frame counter 13D denotes the number of frames accumulated in the input frame buffer 136 and not requested yet for sending.

The read timer 13E, upon occurrence of a sequence number loss, measures a time required until the frame sending is restarted.

The write counter 13F holds a value to be used as an address of writing to the input frame buffer 136.

The buffer write processor 134, upon receiving a frame from the input header processor 12, refers to the flow ID 423 field in the inner header 42 of the received frame. If the flow ID 423 does not denote the identifier of the flow to which the self-buffer controller 131 is allocated, the buffer write processor 134 discards the received frame. If the flow ID 423 denotes the identifier of the flow to which the self-buffer controller 131 is allocated, the buffer write processor 134 executes the buffer write processing S100 for the received frame according to the operation mode set in the setting register 19. The buffer write processor 134 then stores the processed frame in the buffer 136. The detail of these processings will be described later with reference to FIG. 9.

For example, the buffer controller 131-1 corresponding to the flow ID#0 is allocated to process the flow identified by the identifier '#0'. The buffer write processor 134 of the buffer controller corresponding to the flow ID#0 refers to the flow ID 423 set in the received frame. If the value set in the flow ID 423 is '#0', the identifier is the same as the identifier of the flow to which the self buffer controller 131 (the buffer controller 131-1 corresponding to the flow ID#0) is allocated. In this case, the buffer write processor 134 executes the buffer write processing S100 for the received frame and stores the processed frame in the buffer 136.

The buffer read processor 135 executes the processing of a send frame request S400 according to the operation mode set in the setting register 19. As a result, a send frame request that includes the ID information of the flow to which the self buffer controller 131 is allocated is sent to the scheduling unit 132. The details of this processing will be described later with reference to FIG. 13.

Upon receiving the send frame request from the buffer read processor 135, the scheduling unit 132 stores the request once in the send request storage FIFO 137. The scheduling unit 132 then reads the stored send frame request from the send request storage FIFO 137 according to its sequence number. The scheduling unit 132 then sends a send enabling signal to the flow ID buffer controller 131, which is the source of the send frame request read from the FIFO 137.

The FIFO 137 is a memory area managed by the scheduling unit 132. Just like the input frame buffer 136, the FIFO 137 may be a predetermined area secured in the memory area provided in each NIF 10.

Upon receiving the send enabling signal, the buffer read processor 135 reads frames from the input frame buffer 136 and outputs those frames to the frame dispatcher 133.

The frame dispatcher 133, upon receiving a frame from the buffer read processor 135, refers to the input port ID 421 set in the inner header 42 and selects the SW interface 14 corresponding to the input port ID 421, then transfers the frame to the selected SW interface 14. For example, as shown in the example in FIG. 5, when the input/output line interface 11-1 corresponds to the SW interface 14-1, if the value of the input port ID 421 set in the received frame is 'port#0' (the identifier of the input/output line interface 11-1), the frame dispatcher 133 transfers the frame to the SW interface 14-1 corresponding to the input/output line interface 11-1.

Figure 9:
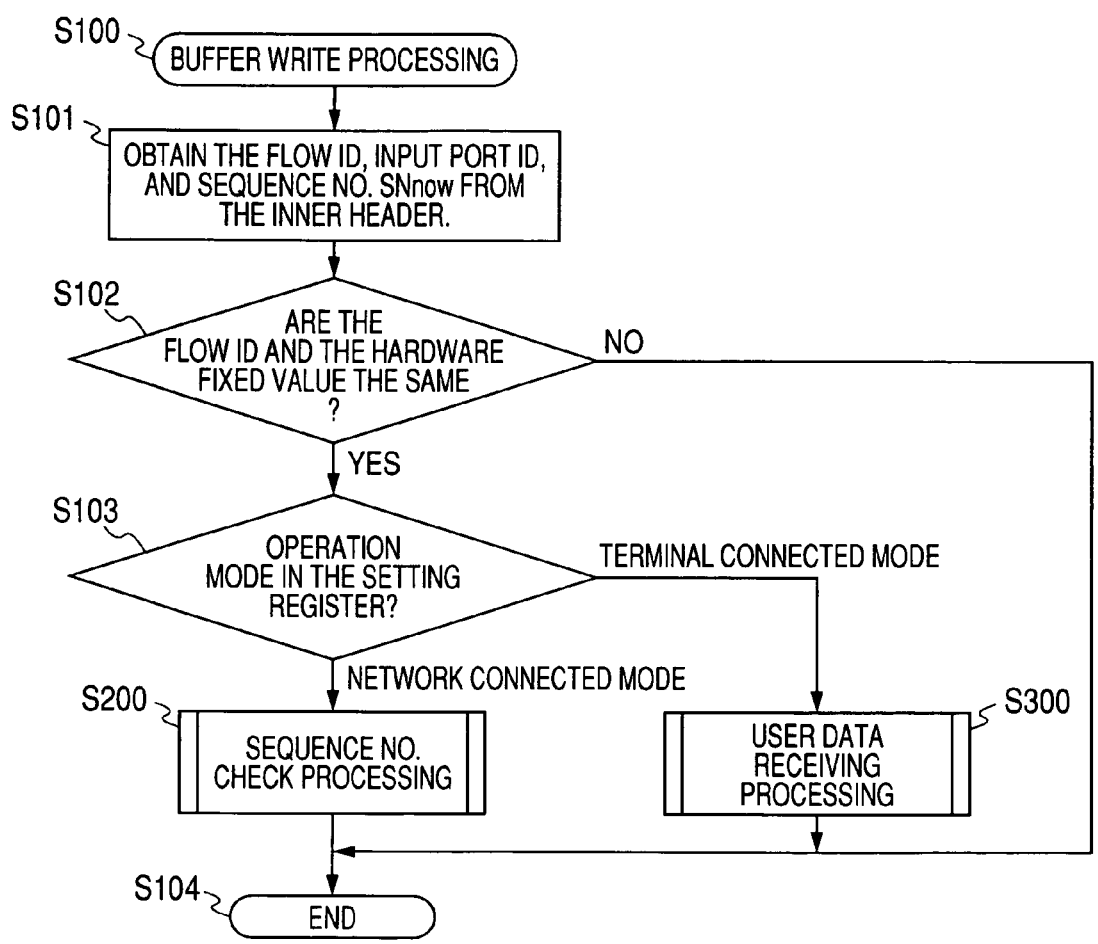
FIG. 9 is a flowchart of a buffer write processing executed by a buffer write processor in the first embodiment of the present invention.

FIG. 9 shows a flowchart of a buffer write processing S100 executed by the buffer write processor 134 in the first embodiment of the present invention.

The buffer write processor 134, upon receiving a frame from the input header processor 12, obtains the values of the input port ID 421, flow ID 423, sequence number SNnow 424, and frame length 426 from the inner header 42 of the received frame (S101).

The buffer write processor 134 then compares the obtained value of the flow ID 423 with that of the flow ID 13C fixed to the hardware and held by the corresponding flow buffer controller 131 (S102).

As a result of the comparison in S102, if the two flow IDs are the same, the self buffer controller 131 (the buffer controller 131 related to the buffer write processor 134 that is executing the processing shown in FIG. 9) is the one allocated to process the flow of the received frame. In this case, the buffer write processor 134 checks the operation mode set in the setting register 19 (S103).

Concretely, if '0' is set in the setting register 19, the buffer write processor 134 determines the operation mode as "terminal connected mode". If '1' is set in the setting register 19, the buffer write processor 134 determines the operation mode as "network connected mode".

Figure 10:
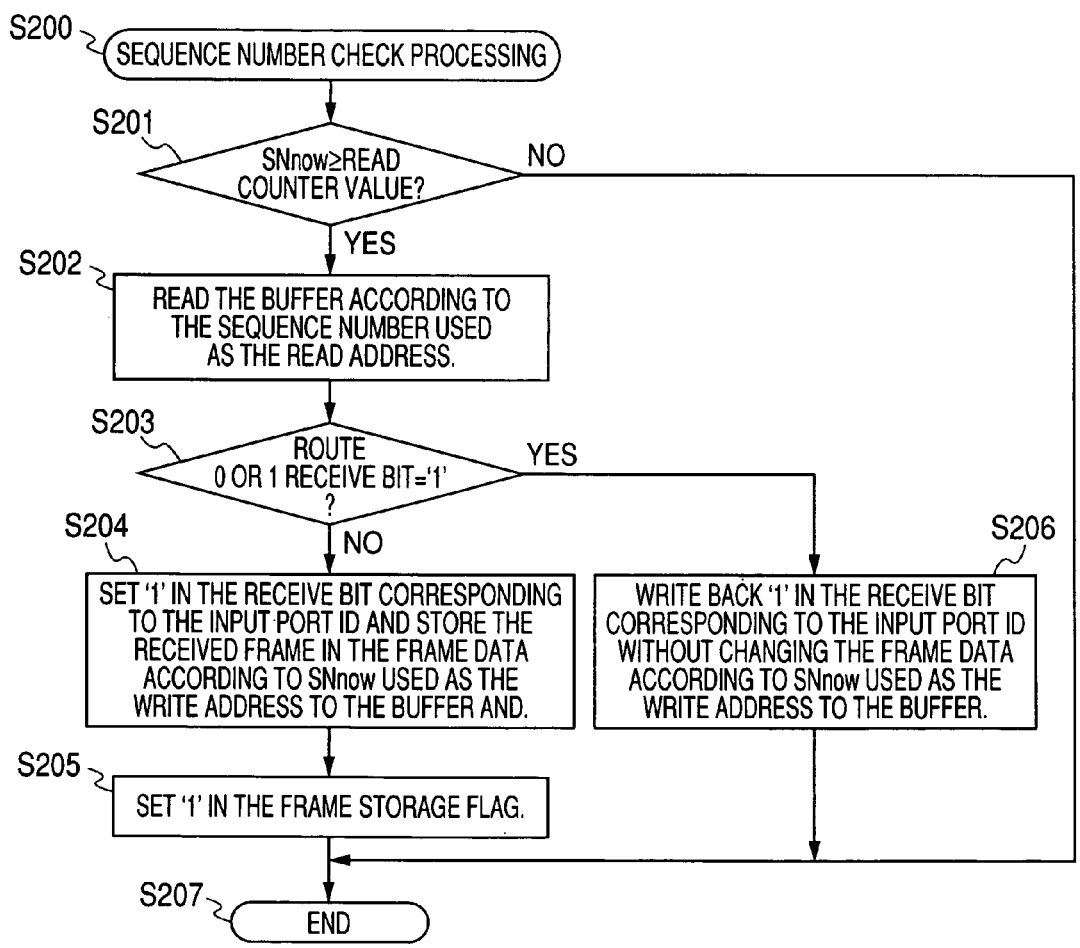
FIG. 10 is a flowchart of a sequence number check processing executed by the buffer write processor in the first embodiment of the present invention.

If the operation mode is determined as "network connected mode" in the check in S103, the buffer write processor 134 executes the sequence number check processing S200 shown in FIG. 10, then exits the processing (S104). On the other hand, if the operation mode is determined as "terminal connected mode", the buffer write processor 134 executes the user data receiving processing S300 shown in FIG. 11, then exits the buffer write processing (S104).

If the two flow IDs are the same in S102, it means that the self-buffer controller 131 is not allocated to process the flow of the received frame. In this case, the buffer write processor 134 exits the buffer write processing without fetching the received frame (S104). In other words, in this case, the buffer write processor 134 does not execute any of the sequence number check processing S200 and the user data receiving processing S300 for the received frame.

FIG. 10 shows a flowchart of the sequence number check processing S200 executed by the buffer write processor 134 in the first embodiment of the present invention.

The processing S200 is executed as follows. At first, upon starting the sequence number check processing S200, the buffer write processor 134 compares the sequence number SNnow 424 obtained from the inner header 42 of the received frame with the value of the read counter 13B held by the buffer controller 131 (S201).

The read counter 13B denotes the read address of the input frame buffer 136. More concretely, the read counter 13B denotes the address of the input frame buffer 136, in which the frame to be requested next for sending (refer to S505 shown in FIG. 14) is stored. In other words, the read counter 13B denotes the next address to be read among those of the input frame buffer that stored the last requested frame.

The buffer write processor 134 uses the sequence number SNnow 424 as the address of writing to the input frame buffer 136. Consequently, comparison between the above read counter 13B and the sequence number SNnow 424 enables determination to be made on whether or not sending of the frame having the same content as that of the received frame or its subsequent frame is already requested. A frame having the same content as that of the received frame means a frame having the same sequence number of that of the received frame. Its subsequent frame means a frame having a sequence number larger than that of the received frame.

If the value of the sequence number SNnow 424 is larger than the value of the read counter 13B as a result of the comparison in S201, it means that it is not requested yet to send the frame having the same content as that of the received frame or its subsequent frame. In this case, it might be requested to send the received frame later. Consequently, if the frame having the same content as that of the received frame is not stored in the frame buffer 136, the received frame should be stored in the frame buffer 136. The buffer write processor 134 thus reads an object frame from the input frame buffer 136 according to the value set in the sequence number SNnow field 424 of the received frame, which is used as the read address (S202).

FIG. 12 shows a configuration of the input frame buffer 136 in the first embodiment of the present invention.

In the input frame buffer 136 shown in FIG. 12 are held a communication route 0 receive bit 1362 that denotes whether or not a frame is received from the communication route 0 NW0; communication route 1 receive bit 1363 that denotes whether or not a frame is received from the communication route 1; and frame data 1364 with respect to each address 1361. The value of the address 1361 corresponds to the value of the sequence number SNnow 424.

In the example shown in FIG. 12, the value '1' in the communication route 0 receive bit 1362 means that a frame is received from the communication route 0 NW0. The value '1' in the communication route 1 receive bit 1363 means that a frame is received from the communication route 1 NW1. For example, '1' and '0' are set in the receive bits 1362 and 1363 of the communication routes 0 and 1 corresponding to the value '6' of the address 1361 shown in FIG. 12, respectively. This means that the packet transfer apparatus that includes the input frame buffer 136 shown in FIG. 12 has already received a frame in which '6' is set in its sequence number SNnow field 424 from the communication route 0 NW0 and has not received the frame yet from the communication route 1 NW1. In this case, in the DATA 6 field of the frame data 1364 is stored the content of the frame received from the communication route 0 NW0.

Instead of storing the data itself, which is the content of each frame in the frame data 1364, it is also possible to store the pointer denoting the data stored position in the frame data 1364 and store the data itself in another frame buffer.

Next, there will be described the processings in and after S202 with reference to FIG. 10 again.

In S202, the buffer write processor 134 reads the values from the fields of the receive bits 1362 and 1363 of the communication routes 0 and 1, as well as the frame data 1364 according to the sequence number SNnow 424 of the received frame. The values in the fields of the receive bits 1362 and 1363 correspond to the value of the address 1361.

The buffer write processor 134 then checks whether or not '1' is set at least in either of the fields of communication route 0 receive bit 1362 and communication route 1 receive bit 1363 (S203).

In S203, if '0' is set in both of the fields of the receive bits 1362 and 1363, the packet transfer apparatus has not received the frame having the same content as that of the received frame from any of the communication routes 0 and 1 before receiving the currently received frame. For example, in the example shown in FIG. 2, if the packet transfer apparatus 10N has received the SN:1 frame 301, it means that the packet transfer apparatus 10N has not received the SN:1 frame before the frame 301, so that it is determined in S203 that '0' is set in both of the receive bits 1362 and 1363.

In this case, the buffer write processor 134 sets '1' in the field of communication route 0 receive bit 1362 or communication route 1 receive bit 1363 corresponding to the input port ID 421 obtained from the inner header 42 of the received frame and stores the received frame together with the inner header 42 in the field of the frame data 1364 (S204). Concretely, if the frame is received from the communication route 0 NW0, the processor 134 sets '0' in the receive bit 1362 and if the frame is received from the communication route 1 NW1, the processor 134 sets '1' in the receive bit 1363.

After this, the buffer write processor 134 sets '1' in the frame storage flag 13A held in the buffer controller 131 (S202), then exits the processing (S207). This frame storage flag 13A denotes whether or not a frame that is not requested yet for sending is stored in the input frame buffer 136. In this embodiment, the value '1' set in the frame storage flag 13A means that such a frame is already stored in the input frame buffer 136.

On the other hand, if '1' is set in any one of the receive bits 1362 or 1363 in S203, it means that the packet transfer apparatus 10N has already received a frame having the same content as that of the currently received frame from a communication route before receiving the currently received frame. For example, in the example shown in FIG. 2, if the packet transfer apparatus 10N receives the SN:1 frame 311, it means that the packet transfer apparatus 10N has already received the SN:1 frame 301 in prior to the frame 311. Thus it is determined in S203 that '1' is set in any of the receive bits 1362 or 1363 (concretely, '1' is set in the communication route 0 receive bit 1362).

In this case, a frame having the same content as that of the currently received frame is already stored in the input frame buffer 136. Consequently, the buffer write processor 134 does not update the value in the frame data 1364 (this means that the processor 134 writes back the content of the frame data field 1364 read in S202 in the input frame buffer 136 as is) and sets '1' in the receive bit corresponding to the input port ID (S206), then exits the sequence number check processing (S207).

If the value set in the sequence number SNnow field 424 is smaller than the value set in the read counter 13B as a result of the comparison in S201, sending of a frame having the same content as that of the received frame or its subsequent frame is already requested. In other words, the buffer write processor 134 is not required to store the received frame in the input frame buffer 136 at that time. Consequently, the buffer write processor 134 discards the received frame and exits the sequence number check processing (S207).

Figure 11:
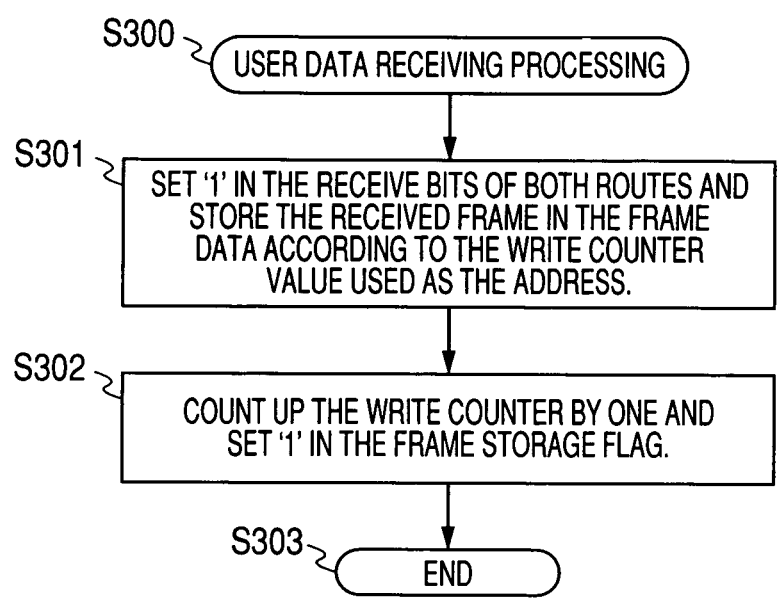
FIG. 11 is a flowchart of a user data receiving processing executed by the buffer write processor in the first embodiment of the present invention.

FIG. 11 shows a flowchart of a user data receiving processing S300 executed by the buffer write processor 134 in the first embodiment of the present invention.

The processing S300 is executed as follows. Upon starting the user data receiving S300 shown in FIG. 11, the buffer write processor 134 sets '1' in the communication route 0 receive bit 1362 and in the communication route 1 receive bit 1363, respectively according to the write address, which is the value set in the write counter 13F, then stores the received frame including the inner header 42 in the frame data field 1364 (S301).

After this, the buffer write processor 134 counts up the value in the write counter 13F by one and sets '1' in the frame storage flag 1A (S302), then exists the user data receiving processing (S303).

The write counter 13F holds a value used as an address of writing to the input frame buffer 136 and it is used only for the user data receiving processing S300.

Figure 13:
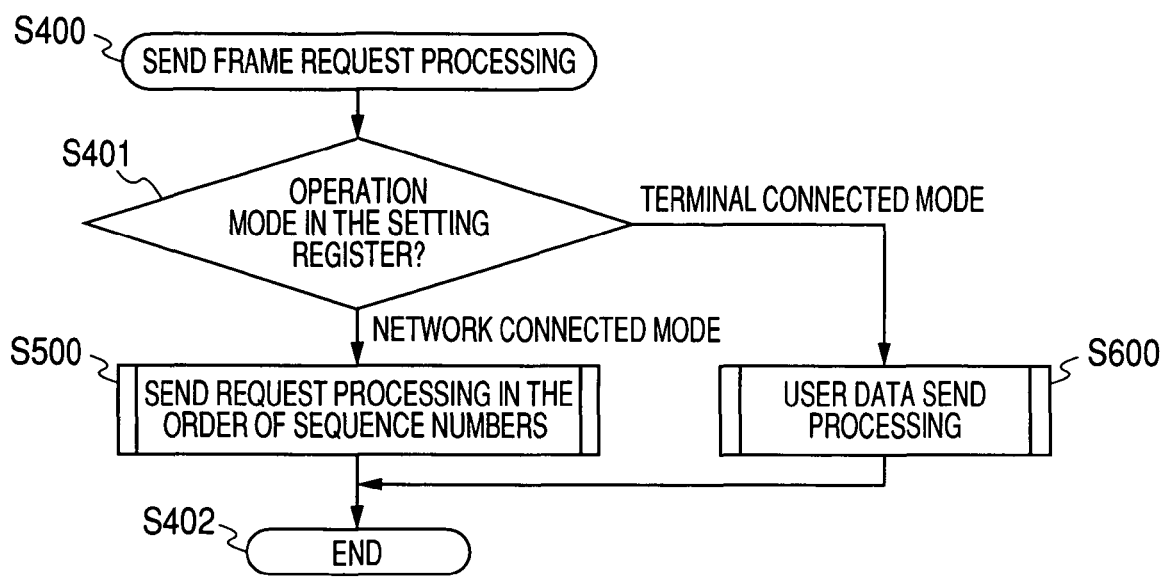
FIG. 13 is a flowchart of a send frame request processing executed by a buffer read processor in the first embodiment of the present invention.

FIG. 13 shows a flowchart of a send frame request processing executed by the buffer read processor 135 in the first embodiment of the present invention.

The buffer read processor 135, upon detecting a status change of the frame storage flag 13A from '0' to '1', checks the operation mode set in the setting register 19 (S401). If the operation mode is "network connected mode", the buffer read processor 135 executes a processing of requesting to send frames in the order of sequence numbers S500 shown in FIGS. 14 and 15, then exits the send frame request processing (S402). On the other hand, if the operation mode set in the setting register 19 is "terminal connected mode", the buffer read processor 135 executes the send user data request processing S600 and exits the send frame request processing (S402).

Figure 14:
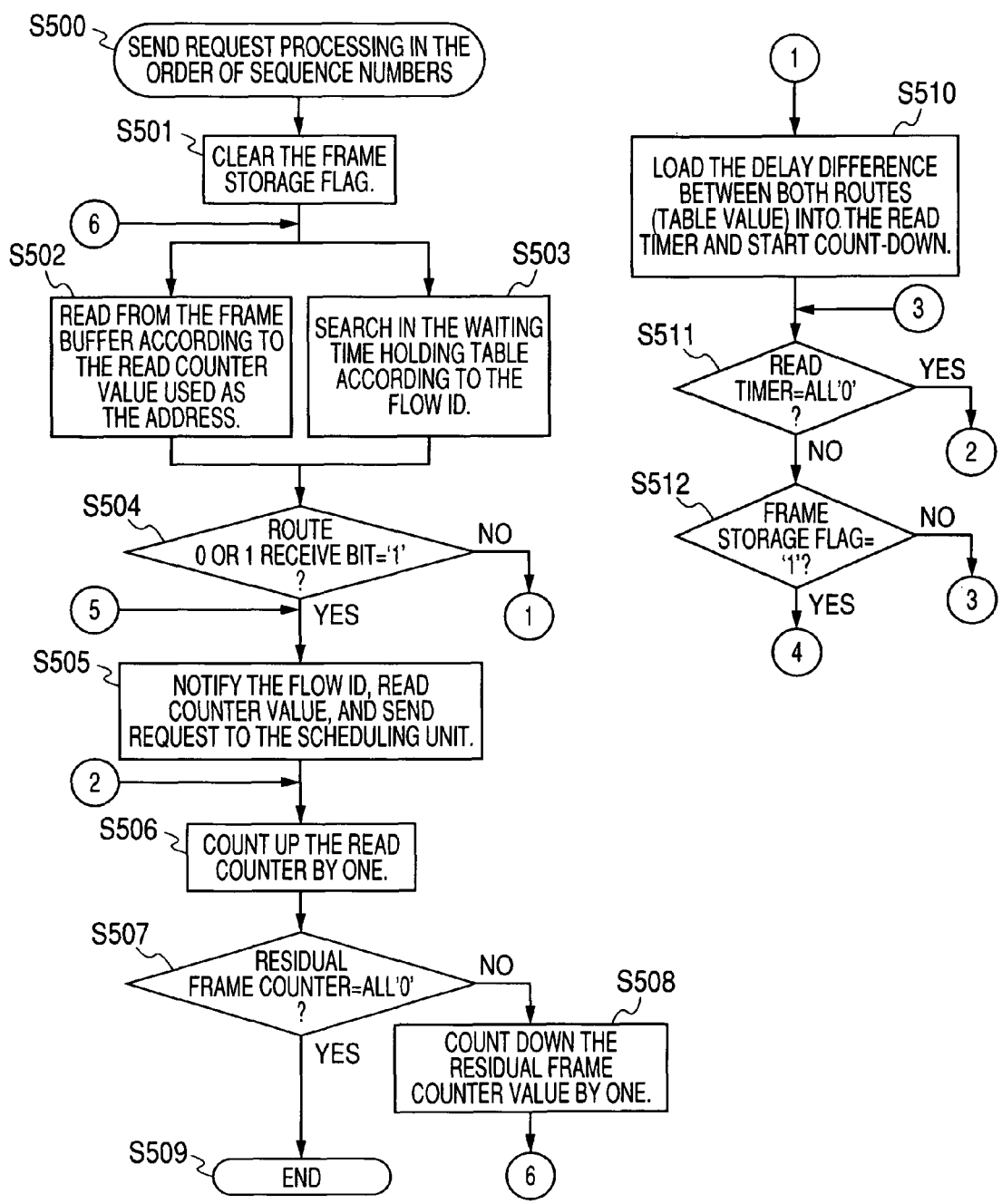
FIG. 14 is a first part of a processing of a request to send frames in the order of sequence numbers, executed by a buffer read processor in the first embodiment of the present invention.
Figure 15:
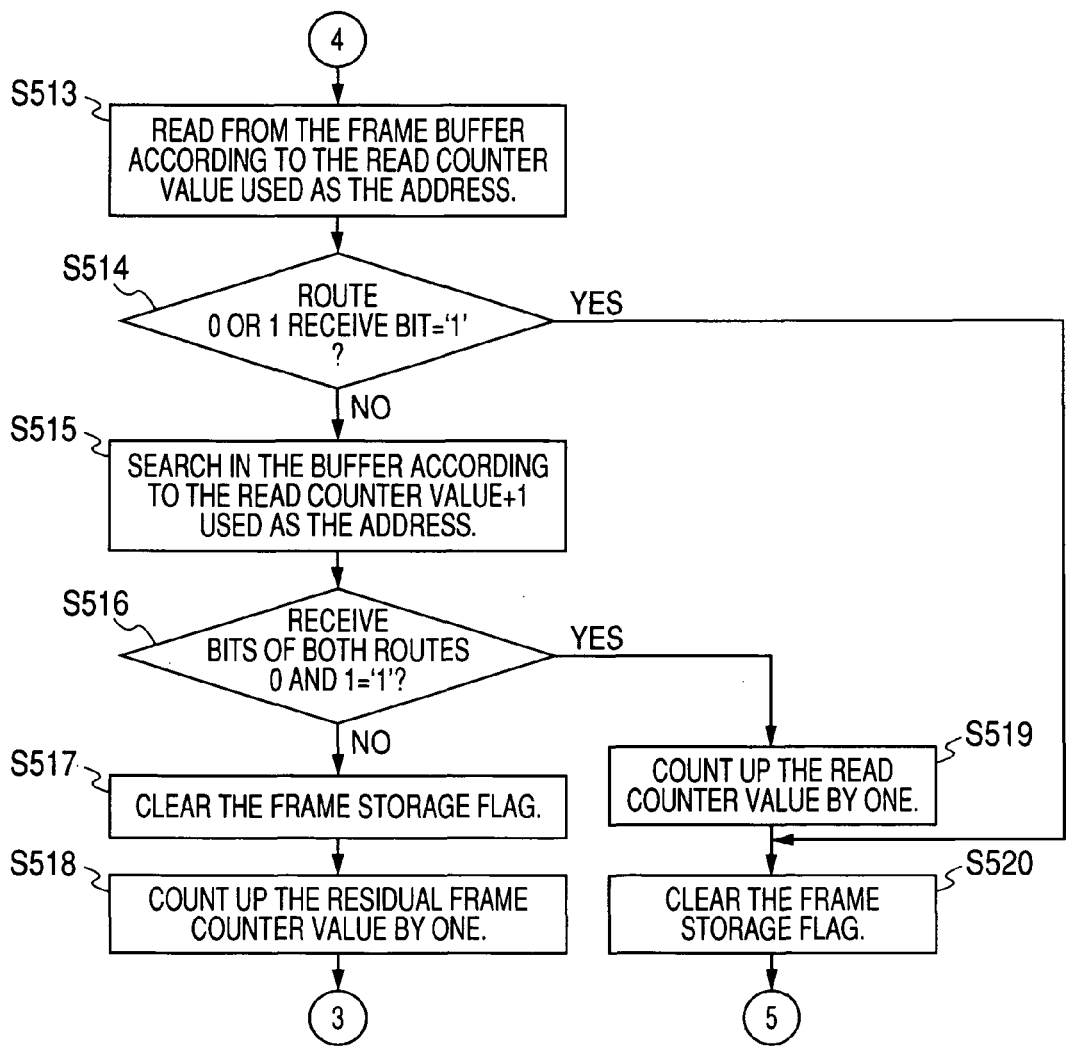
FIG. 15 is a second part of the flowchart of the processing of the request to send frames in the order of sequence numbers, executed by the buffer read processor in the first embodiment of the present invention.

FIGS. 14 and 15 show flowcharts of the processing of requesting to send frames in the order of sequence numbers S500 executed by the buffer read processor 135 in the first embodiment of the present invention.

The processing S500 is executed as follows. At first, upon starting the processing of requesting to send frames in the order of sequence numbers S500 shown in FIGS. 14 and 15, the buffer read processor 135 clears the frame storage flag 13A (reset to '0') (S501).

After that, the buffer read processor 135 reads the object frame from the frame buffer 136 according to the read address that is the value set in the read counter 13B (S502). In parallel to the processing in S502, the buffer read processor 135 makes a search in the waiting time holding table 21 shown in FIG. 17 according to the flow ID 13C used as the search key (S503).

Although S502 and S503 are executed simultaneously in the example shown in FIG. 14, it is also possible to execute S502 first, then S503 or execute S503 first, then S502.

FIG. 17 shows a configuration of the waiting time holding table 21 in the first embodiment of the present invention.

In this embodiment, the waiting time holding table 21 includes a field of delay difference between both of the communication routes 0 NW0 and 1 NW1 with respect to each flow ID 211. This delay difference 212 denotes a delay time difference between communication routes, measured at the time of setting a communication route 2 with respect to each flow and it is set by the subject network manager.

For example, if S503 is executed by the buffer read processor 135 of the buffer controller 131-1 corresponding to the flow ID#0, the value 'Ddif0' of the delay difference 212 is obtained in S503. The 'Ddif0' corresponds to '0' set in the flow ID 211.

Next, there will be described processings to be executed after S502 and S503 with reference to FIG. 14 again.

After executing the processings in S502 and 503, the buffer read processor 135 checks the receive bits 1362 and 1363 of the communication routes 0 and 1, set in the frame read from the input frame buffer 136 in S502 (S504). If '1' is held in any one of the receive bits 1362 and 1363, the object frame is stored in the address denoted by the value set in the read counter 13B in the input frame buffer 136 (this means that a frame having the same sequence number as the value set in the read counter 13B is already received). In this case, the buffer read processor 135 sends a send frame request together with the flow ID 13C and the value of the read counter 13B to the scheduling unit 132 (S505).

After this, the buffer read processor 135 counts up the value in the read counter 13B by one (S506).

The buffer read processor 135 then checks whether or not all '0' is set in the residual frame counter 13D (S507). The residual frame counter 13D denotes the number of frames stored in the input frame buffer 136, but not requested yet for sending when frame sending stops temporarily.

If the value in the residual frame counter 13D is determined to be all '0' in the check in S507, it means that there is no frame requested for sending in the input frame buffer 136. In this case, the buffer read processor 135 exits the processing for requesting to send frames in the order of sequence numbers (S509).

On the other hand, if all '0' is not set in the residual frame counter 13D in S507, it means that there is no frame requested for sending in the input frame buffer 136. In this case, the buffer read processor 135 counts down the value in the residual frame counter 13D by one (S508). This is because the number of frames stored in the input frame buffer 136 and not requested yet for sending is reduced by one as a result of the processing executed in S505.

After this, the residual frame counter 13D executes the processings in S502 and S503, as well as their subsequent processings again.

On the other hand, if '0' is set in both of the receive bits 1362 and 1363 in S504, the buffer read processor 135 determines it as a sequence number loss. In other words, in FIG. 2, if the SN:2 frame 302 is lost and the packet transfer apparatus 10N receives the SN:3 frame 303 before receiving the SN:2 frame 312, the buffer read processor 135 determines in S504 that '0' is set in both of the receive bits 1362 and 1363.

In this case, the buffer read processor 135 stops the frame sending until receiving a frame having the same content as that of the lost frame from the other communication route 0 NW0/1 NW1. However, if the buffer read processor 135 cannot receive the frame having the same content as that of the lost frame from the other communication route within a predetermined time (the value set in the delay difference 212 obtained in S503), the buffer read processor 135 determines that two frames having the same content are lost in both of the two communication routes 0 NW0 and 1 NW1, then restarts sending of frames. Consequently, the buffer read processor 135 sets the value of the delay difference 212 obtained in S503 for the read timer 13E and begins the timer 13E countdown (S510). This read timer 13E is used to measure the waiting time required until the restart of frame sending. The value set in the read timer 13E is reduced with time after the count-down begins and becomes '0' finally.

After this, the buffer read processor 135 checks whether or not all '0' is set in the read timer 13E (S511).

If all '0' is not set in the read timer 13E, it means that the waiting time does not expire yet. In this case, the buffer read processor 135 checks whether or not '1' is set in the frame storage flag 13A (S512). If '1' is set in the flag 13A, it means that a frame is received before the read timer 13E expires (the waiting time expires). In this case, the buffer read processor 135 reads the frame from the input frame buffer according to the value in the red counter 13B used as the read address (S513), then checks whether or not '1' is set either in the communication route 0 receive bit 1362 or in the communication route 1 receive bit 1363 (S514).

If '1' is set in at least one of the receive bits 1362 and 1363, it means that the frame having the lost sequence number has arrived. In this case, the buffer read processor 135 clears the frame storage flag 13A (S520). The buffer read processor 135 then executes the processings in and after S505 to create a send sequence number request with respect to the arrived frame.

If '0' is set in both of the receive bits 1362 and 1363 in S514, it means that the frame that has arrived does not have the lost sequence number. In this case, the buffer read processor 135 reads a frame from the input frame buffer 136 (S515) according to the read address, which is a value obtained by adding '1' to the value in the read counter 13B, then checks whether or not the frame having the next sequence number of the lost one has been received from both of the communication routes 0 NW0 and 1 NW1. Then, the buffer read processor 135 checks whether or not '1' is set in both of the receive bits 1362 and 1363 (S516).

If '1' is set in both of the receive bits 1362 and 1363, it means that the frame having the lost sequence number has been lost in the two communication routes 0 NW0 and 1 NW1. In this case, the buffer read processor 135 counts up the value in the read counter 13B by one (S519). The buffer read processor 135 then executes the processings in and after S520 to create a send frame request with respect to the frame having the next sequence number of the lost one.

If '0' is set in at least one of the receive bits 1362 and 1363 in the check carried out in S516, the buffer read processor 135 is required to continuously wait for the arrival of the frame having the lost sequence number. Consequently, the buffer read processor 135 clears the frame storage flag 13A (S517) and counts up the value in the residual frame counter 13D by one, then executes the processings in and after S511.

If all '0' is set in the read timer 13E in S511, the buffer read processor 135 determines that the frame having the lost sequence number has been lost in the two communication routes NW0 and NW1. In this case, the buffer read processor 135 executes the processings in and after S506 to create a send frame request with respect to a frame having the next sequence number of the lost one. Thus the frame sending is restarted to send the frame having the next sequence number of the lost one.

If '0' is set in the frame storage flag in S512, the buffer read processor is required to continuously wait for the arrival of the frame having the lost sequence number. Thus the buffer read processor 135 executes the processings in and after S511.

For example, in FIG. 2, if the SN:2 frame 302 is lost and the packet transfer apparatus 10N receives the SN:2 frame 312 after receiving the SN:3 frame 303 and before the time of the delay difference 81 expires, the buffer read processor 135 determines in S511 that all '0' is not set in the read timer 13E, and in S512 that '1' is set in the frame storage flag 13A. Furthermore, the buffer read processor 135 also determines in S514 that '1' is set in the receive bit 1363 of the communication route 1.

In the example shown in FIG. 2, if the SN:2 frame 312 is lost and the packet transfer apparatus 10N receives the SN:3 frame 313 before the time of the delay difference 81 expires, it is determined in S511 that all '0' is not set in the read timer 13E. And it is also determined in S512 that '1' is set in the frame storage flag 13A. Furthermore, it is determined in S514 that '0' is set in the receive bits 1362 and 1363 of both of the communication routes 0 and 1. Furthermore, it is determined in S516 that '1' is set in both the receive bits 1362 and 1363 of both of the communication routes 0 and 1.

In the example shown in FIG. 2, if the time of the delay difference 81 expires before the packet transfer apparatus 10N does not receive any of the SN:2 frame 312 and the SN:3 frame 313, it is determined in S511 that all '0' is set in the read timer 13E.

Figure 16:
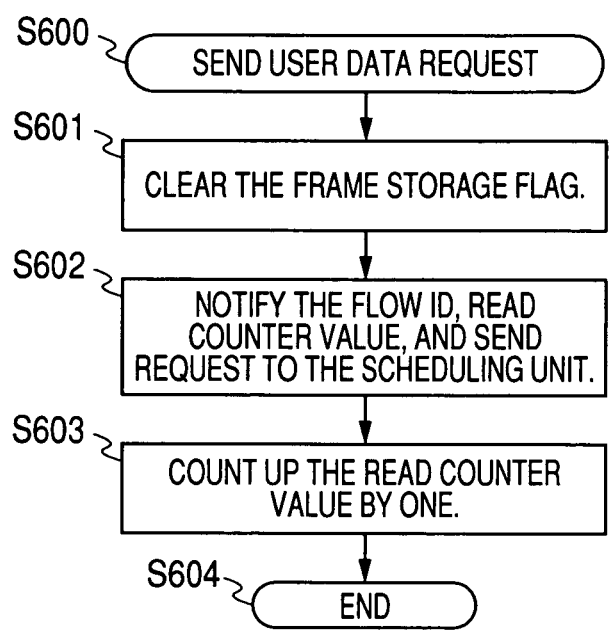
FIG. 16 is a flowchart of a send user data request processing executed by the buffer read processor in the first embodiment of the present invention.

FIG. 16 shows a flowchart of a send user data request processing S600 executed by the buffer read processor 135 in the first embodiment of the present invention.

The processing S600 is executed as follows. At first, upon starting the send user data request processing S600 shown in FIG. 16, the buffer read processor 135 clears the frame storage flag 13A (S601).

After this, the buffer read processor 135 sends a send frame request to the scheduling unit 132 together with the values in the flow ID 13C and in the read counter 13B (S602).

Then, the buffer read processor 135 counts up the value in the read counter 13B by one (S603), then exits the processing (S604).

As described above, the send user data request processing S600 is completed when the user data receiving processing S300 reads frames from the input frame buffer 136 sequentially in the order of addresses.

Although not shown in the flowchart in FIG. 16, the scheduling unit 132, upon receiving the above send user data request from the buffer read processor 135, stores the received request in the send request storage FIFO 137 together with the flow ID and the read counter value notified simultaneously, then multiplexes the send request received from the subject flow ID buffer controller 131. Then, the scheduling unit 132 reads the send requests one by one from the send request storage FIFO 137 to notify the send enable and the read counter value to each buffer controller 131-i corresponding to each flow ID read from the FIFO 137.

Figure 18:
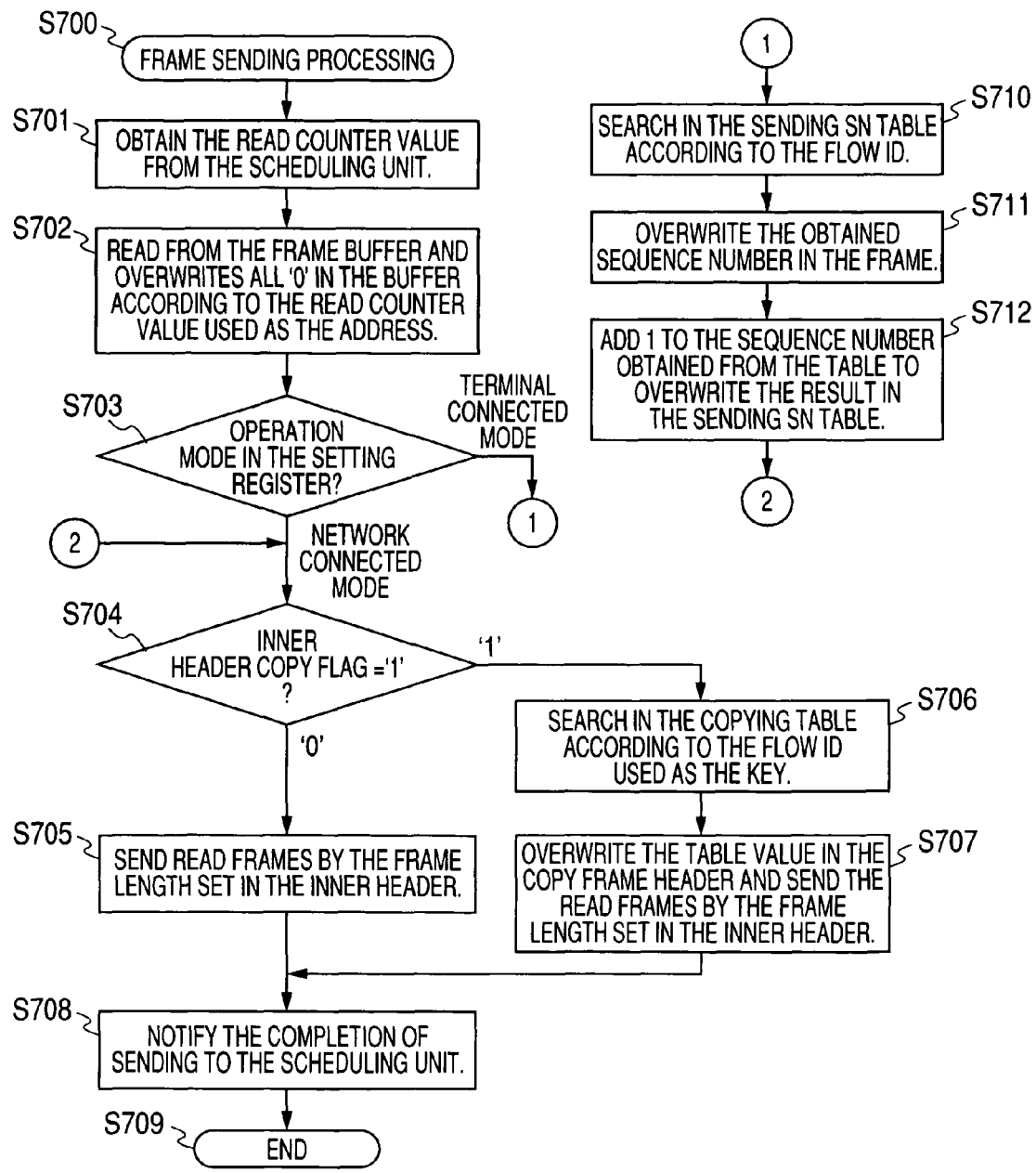
FIG. 18 is a flowchart of a frame sending processing executed by the buffer read processor in the first embodiment of the present invention.

FIG. 18 shows a flowchart of a frame sending processing S700 executed by the buffer read processor 135 in the first embodiment of the present invention.

At first, upon receiving a send enabling signal from the scheduling unit 132, the buffer read processor 135 obtains the read counter value sent together with this send enabling signal (S701).

Then, the buffer read processor 135 reads the object frame from the input frame buffer 136 according to the obtained read counter value used as the read address. After that, the buffer read processor 135 overwrites all '0' in the entry of the address (S702).

Then, the buffer read processor 135 checks the operation mode set in the setting register (S703).

If the operation mode is determined to be "network connected mode" in S703, the frame read in S702 is required to be sent to another packet transfer apparatus through at least one of the communication routes 0 NW0 and 1 NW1. In this case, the buffer read processor 135 checks the copy bit 425 set in the inner header 42 (S704).

If '0' is set in the copy bit 425 in S704, it means that there is no need to copy the read frame. Consequently, the buffer read processor 135 sends the frame data 1364 read from the input frame buffer 136 just by the frame length 426 set in the inner header 42 (S705).

The buffer read processor 135 then notifies the scheduling unit 132 of the completion of the sending (S708), then exits the frame sending processing (S709).

On the other hand, if '1' is set in the copy bit 425 of the inner header 42 in S704, it means that it is required to copy the read frame. Thus the buffer read processor 135 makes a search in the copying table 22 shown in FIG. 19 according to the flow ID 13C used as the search key (S706). As a result, the buffer read processor 135 obtains the object header information to be added to the copied frame.

FIG. 19 shows a configuration of the copying table 22 in the first embodiment of the present invention.

The copying table 22 holds header information to be added to each copied frame. In other words, the copying table 22 is used to search table entries denoting the MPLS label 222, output NIF ID 223, output port ID 224, source MAC address, and destination MAC address 226 according to the flow ID 221 used as the search key. Here, the source MAC address 225 is added to an input/output line interface 11-i identified by the value set in the output port ID 224. The destination MAC address 226 is added to a packet transfer apparatus connected to the input/output line interface 11-i and assumed as a destination of a frame.

Next, there will be described a processing that follows that in S706 with reference to FIG. 18 again.

Upon obtaining the header information to be added to a copy of a frame in S706, the buffer read processor 135 sends the subject frame just like in the frame sending processing in S705 and copies the frame, then sends the copy of the frame (S707).

Concretely, the buffer read processor 135 sends the subject frame just like in the frame sending processing in S705. Furthermore, the buffer read processor 135 copies the frame to be sent. The buffer read processor 135 then overwrites the destination MAC address 226, source MAC address 225, and MPLS label 222 obtained, respectively from the copying table in S706 on the destination MAC address 411, source MAC address 412, and MPLS header 414 set, respectively in the MAC header of the copy frame. Furthermore, the buffer read processor 135 overwrites the output ID 223 and the output port ID 224 obtained from the copying table in S706 on the output NIF ID 427 and output port ID 422 set in the inner header 42 of the copy frame. Furthermore, the buffer read processor 135 inverts the input port ID 421 of the frame copy. Then, the buffer read processor 135 sends the frame portion read in accordance with the frame length 426 set in the inner header 42.

The reason why the input port ID 421 is inverted in S707 is that the frame copy is required to be sent to the other communication route that is not used by the original frame. The frame dispatcher 133 sends each frame to the SW interface 14 corresponding to the input port ID 421. Consequently, if the buffer read processor 135 changes the input port ID 421 in S707, the frame dispatcher 133 dispatches frame copies to the other (empty) port.

After this, the buffer read processor 135 notifies the scheduling unit 132 of the completion of sending (S708), then exits the frame sending processing (S709).

If "terminal connected mode" is set in the setting register in S703, the buffer read processor 135 makes a search in the sending SN table 23 shown in FIG. 20 according to the flow ID 13C used as the search key (S710).

FIG. 20 shows a configuration of the sending SN table 23 in the first embodiment of the present invention.

The sending SN table shown in FIG. 20 holds send sequence numbers 232 added to the sequence number field 415 of each frame to be sent and searched according to the flow ID 231 used as the search key. In other words, the field of the sequence number 232 holds a sequence number to be added to a frame to be sent next in each flow. The buffer read processor 135 executes the processing in S710 to obtain the sequence number to be added to the next object frame to be sent.

After executing the processing in S710, the buffer read processor 135 overwrites the sequence number 232 obtained from the send SN table on the field of the sequence number 415 in the frame (S711). Then, the buffer read processor 135 writes back an obtained value in the entry in the send SN table 23 (S712). The value is obtained by adding '1' to the sequence number 232 obtained from the table.

The buffer read processor 135 then executes the processings in and after S704 that checks the copy bit 425 in the inner header 42 to send the sequence number overwritten frame.

As described above, the packet transfer apparatus in the first embodiment of the present invention, if a frame is lost in one communication route, waits for the frame having the same content as that of the lost one from the other communication route. If it is possible to receive a frame having the same content as that of the lost one such way, frame losses will be prevented by transferring such an alternative frame.

Furthermore, the packet transfer apparatus in the first embodiment of the present invention restarts transfer of frames subsequent to the lost frame according to predetermined conditions even when not receiving any alternative frame having the same content as that of the frame lost in one communication route from the other communication route. Consequently, the packet transfer apparatus in the first embodiment of the present invention can prevent a case in which frame transfer is disabled even while holding frames that can be transferred.

Next, there will be described a second embodiment of the present invention.

Figure 21:
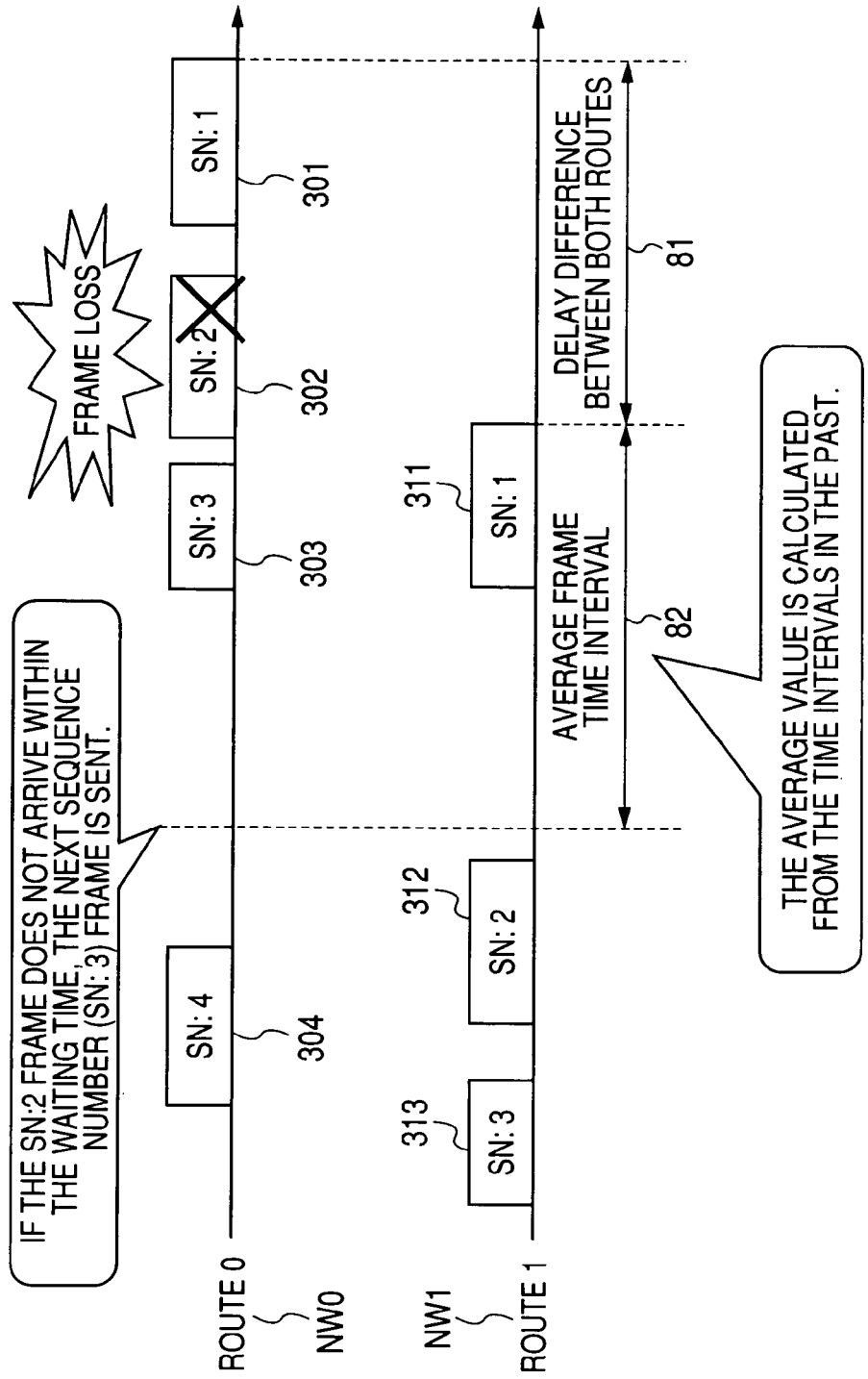
FIG. 21 is a diagram illustrating an outline of an operation of a packet transfer apparatus in a second embodiment of the present invention.

FIG. 21 shows a diagram that describes an operation of a packet transfer apparatus LON in the second embodiment of the present invention.

In FIG. 21, there are only two differences from FIG. 2; how the packet transfer apparatus 10N sets a waiting time for a frame having the same sequence number as that of a lost frame and what value is to be set for the waiting time. Hereunder, there will be described only those differences between FIG. 21 and FIG. 2. In the description to be made with reference to FIG. 21, the same portions as those of FIG. 2 will thus be omitted.

In FIG. 21, the packet transfer apparatus 10N sets a delay difference 81 and an average frame time interval (an average value of frame time intervals) 82 for the timer (refer to FIG. 23) each time it receives a frame having a sequence number (SN) that has not received yet from any of the communication routes 0 and 1, then begins count-down of the timer. The average frame time interval 82 is an average value of the time intervals for receiving frames in each flow checked by the packet transfer apparatus 10N.

Usually, if there is no frame loss detected, the timer is updated each time a frame is received and the received frame is sent out immediately. However, if a frame is lost (e.g., the SN:2 frame 302 to be received from the communication route 0 NW0) and its sequence number loss is detected, the packet transfer apparatus 10N stops the frame sending temporarily without updating the timer. Then, when the timer is reset to '0' or the SN:2 frame 312 that is lost in one communication route is received from the other communication route, or when the SN:3 frame is received from both of the routes, the packet transfer apparatus 10N restarts the frame sending.

Concretely, the packet transfer apparatus 10N, if receiving the SN:3 frame 303 in prior to the SN:2 frame 302, determines that the frame 302 is lost in the communication route 0 NW0. And if receiving the SN:2 frame having the same content as that of the lost frame from the communication route 1 NW1 before the timer is reset to '0', the packet transfer apparatus 10N sends the frame 312 to the destination. Furthermore, if receiving the SN:3 frame 313 from the communication route 1 NW1 before the timer is reset to '0' or before receiving the SN:2 frame 312, the packet transfer apparatus 10N sends the SN:3 frame 303 or frame 313 to the destination.

Then, if the timer is reset to '0' before receiving the SN:2 frame 312 or SN:3 frame 313, the packet transfer apparatus 10N sends the SN:3 frame 303 to the destination.

Figure 22:
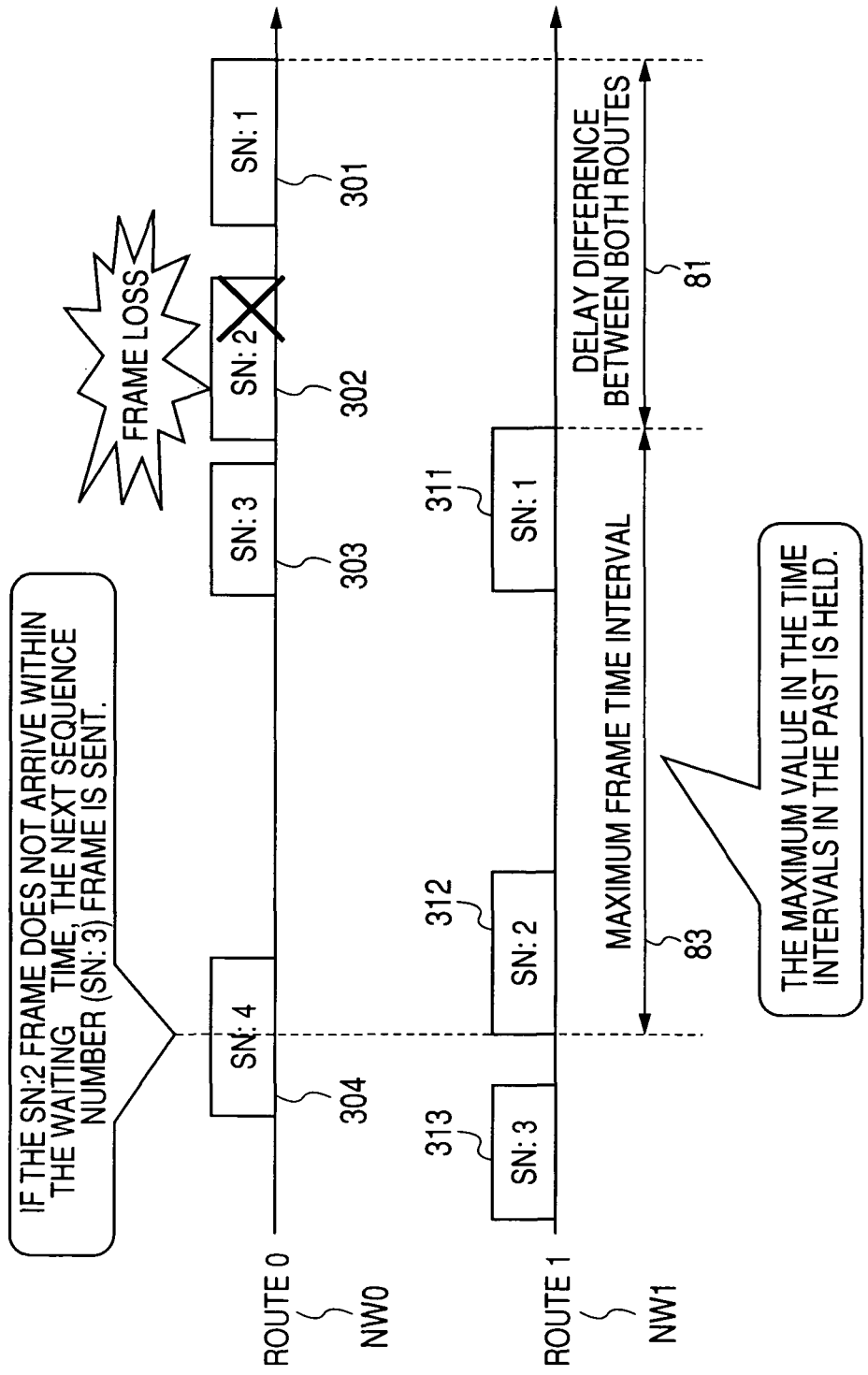
FIG. 22 is a diagram illustrating an outline of an operation of a packet transfer apparatus in a variation of the second embodiment of the present invention.

FIG. 22 is a diagram that describes a variation of the operation of the packet transfer apparatus 10N in the second embodiment of the present invention.

In FIG. 22, instead of the average frame time interval 82, the maximum value of the frame time interval 83 is set for the timer. Other items in FIG. 22 are the same as those shown in FIG. 21. In other words, the maximum value of the frame time interval 83 described above means the maximum value of the frame receiving time interval of each flow checked by the packet transfer apparatus 10N.

The method shown in FIG. 21 is suitable for a mixed network in which the TDM emulation or VoIP traffic with less frame jittering exists together with the streaming traffic that has made bandwidth adjustment with use of a traffic shaper at the inlet of the subject network.

On the other hand, the method shown in FIG. 22 can also cope with the traffics having extremely large frame jittering, although the method is required not to set such a period as a break of a stream, in which no traffic arrives, as the maximum frame time interval 83. This is why each packet transfer apparatus may have its own maximum value and the maximum value may be limited only within a certain multiple of the current maximum.

As described above, the methods shown in FIGS. 21 and 22 can be adjusted to the characteristics of the traffic of each flow, thereby the present invention can apply to any cases in which different characteristic traffics are mixed.

According to the methods shown in FIGS. 21 and 22, just like in FIG. 2, if the SN:3 frame 313 is lost in the communication route 1 NW1 and a line error occurs in one communication route, frame loss can be prevented without stopping the frame sending completely.

Furthermore, according to the method shown in FIG. 2, the packet transfer apparatus is required to wait for a frame just by a fixed delay time set in the table. Consequently, the packet transfer apparatus cannot cope with delay changes to be caused by the actual usage or setting of the network. According to the method shown in FIGS. 21 and 22, however, the traffics in the past are reflected on the frame waiting time. Thus the method can cope with the above described changes in the usage of the network automatically.

Figure 23:
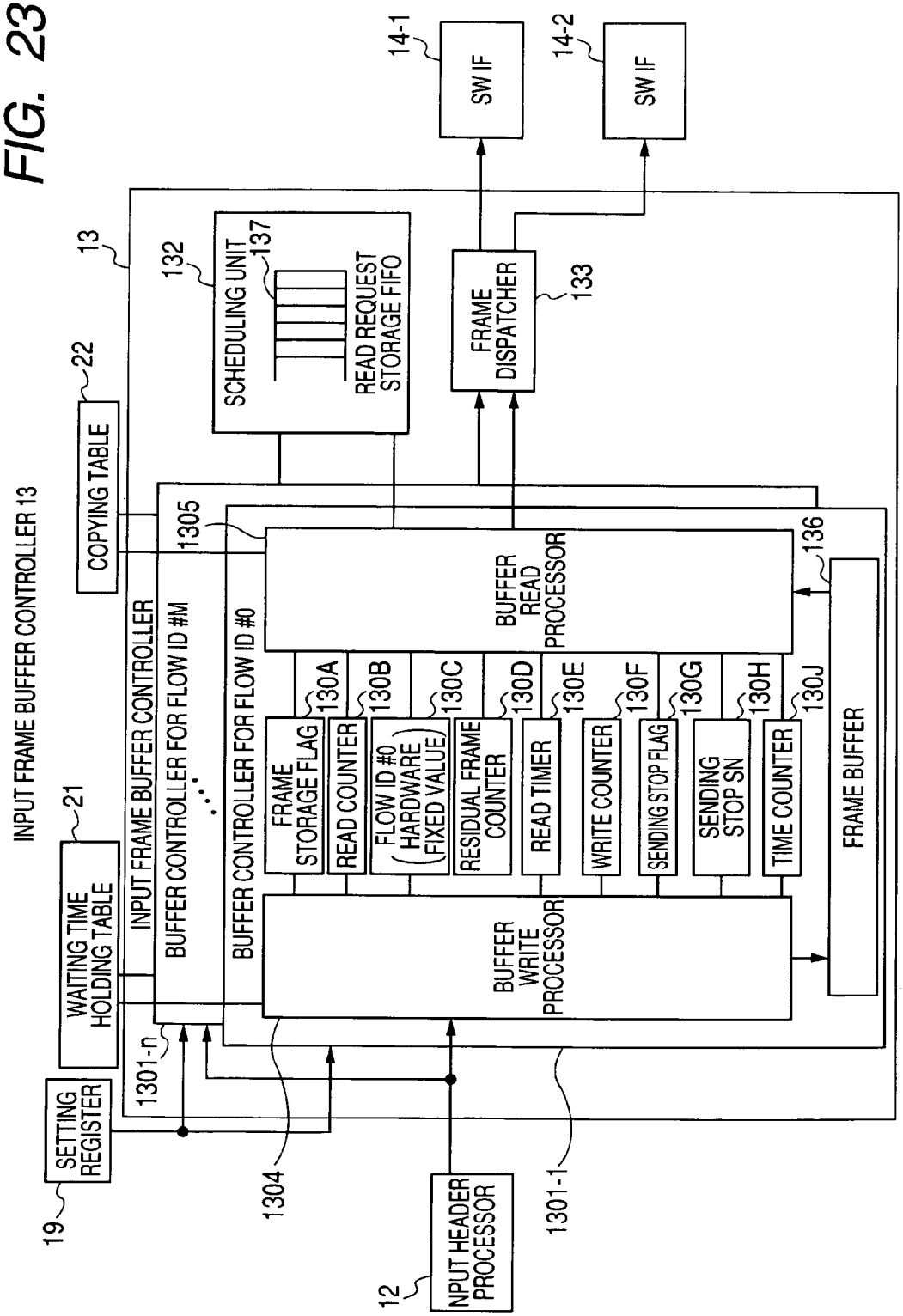
FIG. 23 is a block diagram of an input frame buffer controller in the second embodiment of the present invention.

The configuration of the packet transfer apparatus 10N in this second embodiment is the same as that shown in FIG. 5 in the first embodiment. The configuration and functions of only the input frame buffer controller 13 differs from those in the first embodiment. Hereunder, therefore, there will be described only those differences from the first embodiment. FIG. 23 shows a block diagram of a configuration of the input frame buffer controller 13 in this second embodiment of the present invention.

The input frame buffer controller 13 includes buffer controllers 1301 (1301-1 to 1301-n) corresponding to flow IDs, respectively, a scheduling unit 132 connected to those buffer controllers 1301, and a frame dispatcher 133 connected to those buffer controllers 1301.

The buffer controller 1301 includes a buffer write processor 1304, a buffer read processor 1305, and an input frame buffer 136.

Furthermore, the buffer controller 1301 holds a frame storage flag 130A, a read counter 130B, a flow ID 130C, a residual frame counter 130D, a read timer 130E, a write counter 130F, a sending stop flag 130G, a sending stop sequence number (SN) 130H, and a time counter 130J.

The frame storage flag 130A, read counter 130B, flow ID 130C, residual frame counter 130D, read timer 130E and write counter 130F are all the same as those in the first embodiment.

The sending stop flag 130G is set when frame sending stops.

The sending stop SN 130H holds a sequence number just in prior to a lost sequence number (the sequence number of the last frame sent out just before the sending stops).

The time counter 130J holds the current time.

The configuration of the input frame buffer 136 is the same as that in the first embodiment (refer to FIG. 12).

The buffer write processor 1304, upon receiving a frame from the input header processor 12, refers to the flow ID 423 set in the inner header 42 of the received frame. If the flow ID 423 differs from the identifier of the flow to which the self buffer controller 1301 is allocated, the buffer write processor 1304 discards the received frame. If the flow ID 423 is the same as the identifier of the flow to which the self buffer controller 1301 is allocated, the buffer write processor 1304 executes the buffer write processing S100 for the received frame according to the operation mode set in the setting register 19. As a result, the received buffer is stored according to the sequence number in the buffer 136.

The buffer read processor 1305 executes the send frame request processing S400 according to the operation mode set in the setting register 19. As a result, the send frame request including the ID information of the flow to which the self buffer controller 1301 is allocated is sent to the scheduling unit 132.

Upon receiving the above send frame request, the scheduling unit 132 stores the request once in the request storage FIFO 137. The scheduling unit 132 reads the requests stored in the request storage FIFO 137 sequentially as needed. Then, the scheduling unit 132 sends a send enabling signal to the request source buffer controller 1301.

Upon receiving the send enabling signal, the buffer read processor 1305 reads the requested frame from the input frame buffer 136 and outputs the frame to the frame dispatcher 133.

Upon receiving the frame from the buffer read processor 1305, the frame dispatcher 133 refers to the input port ID 421 set in the inner header 42 of the received frame to select a SW interface 14 corresponding to the input port ID 421, then transfers the frame to the selected SW interface 14.

The relationship between the input/output line interface and the SW interface 14 is the same as that in the first embodiment (refer to the description with reference to FIG. 5).

The buffer write processor 1304 in this second embodiment executes the buffer write processing 5100 shown in FIG. 9 just like the buffer write processor 134 in the first embodiment. However, the buffer write processor 1304 in this second embodiment executes the sequence number check processing S800 shown in FIG. 24 instead of the sequence number check processing S200.

Figure 24:
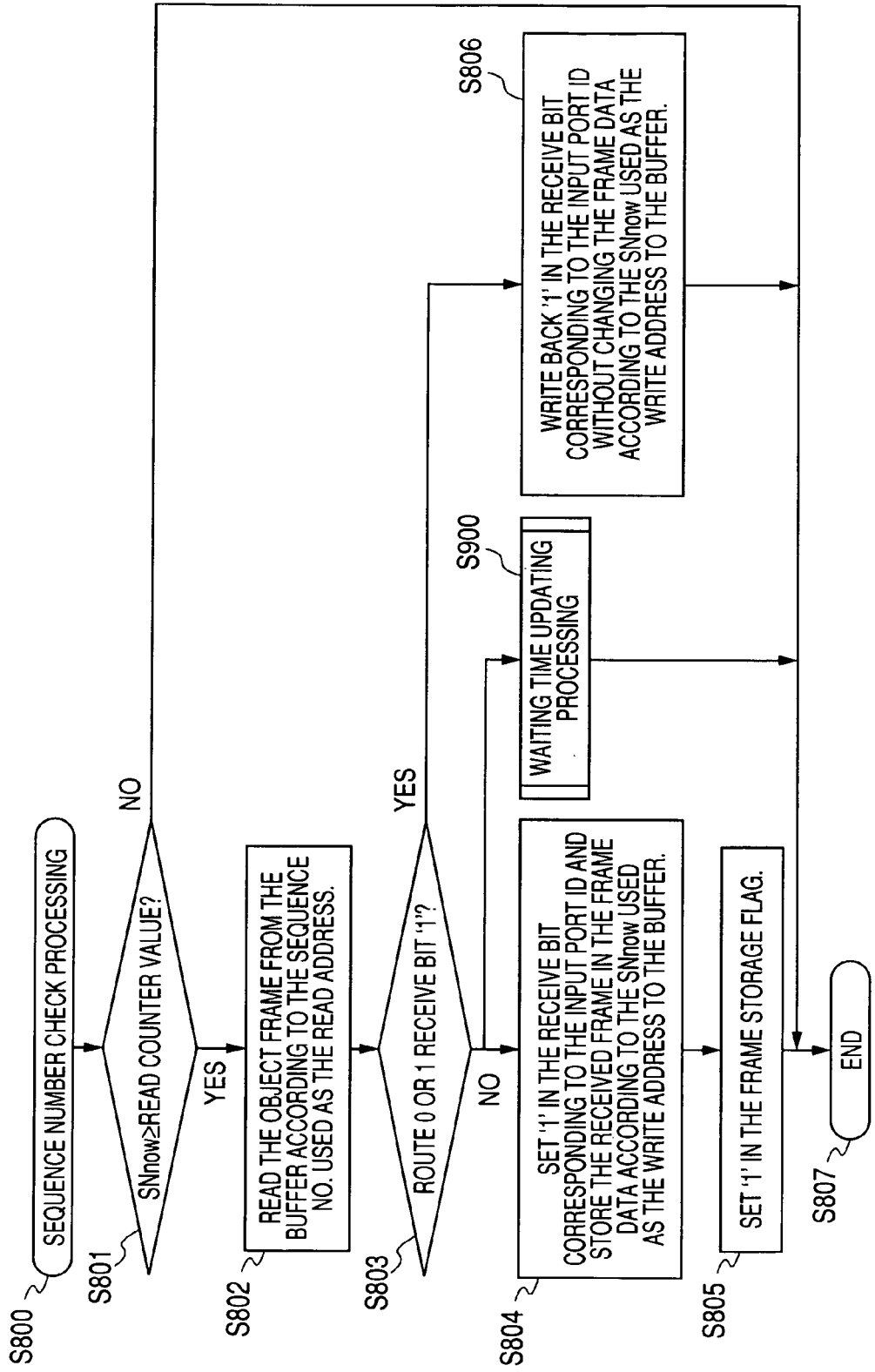
FIG. 24 is a flowchart of a sequence number check processing executed by a buffer write processor in the second embodiment of the present invention.

FIG. 24 shows a flowchart of the sequence number check processing S800 executed by the buffer write processor 1304 in this second embodiment of the present invention.

Upon starting the sequence number check processing S800 shown in FIG. 24, the buffer write processor 1304 compares the sequence number SNnow 424 obtained from the inner header 42 of the received frame with the value set in the read counter 130B held by the buffer controller 131 (S801). The read counter 130B denotes a read address of the input frame buffer 136.

The buffer write processor 1304 uses the sequence number SNnow 424 as an address of writing to the input frame buffer 136. This is why the buffer write processor is enabled to determine whether or not a frame having the same content as that of the received frame is already requested for sending by comparing the value set in the read counter 130B with the sequence number SNnow 424.

As a result of the comparison in S801, if the value of the sequence number SNnow 424 is over the value set in the read counter 130B, it means that the frame having the same content as that of the received frame is not requested yet for sending. In other words, the frame having the same content as that of the received frame might not be stored yet in the input frame buffer 136. In this case, the buffer write processor 1304 reads the input frame buffer 136 shown in FIG. 12 according to the read address that is the value of the sequence number SNnow 424 of the received frame (S802). This reading procedure is the same as that in S202 shown in FIG. 10.

After this, the buffer write processor 1304 checks whether or not '1' is set in at least one of the receive bits 1362 and 1363 read above (S803).

If '0' is set in both of the receive bits 1362 and 1363 in S803, the buffer write processor 1304 sets '1' in the receive bit 1362 or 1363 corresponding to the input port ID 421 obtained from the inner header 42 of the received frame, then stores the received frame in the frame data 1364 together with its inner header 42 (S804).

After this, the buffer write processor 1304 sets '1' in the frame storage flag 130A held in the buffer controller 1301 (S805).

Furthermore, the buffer write processor 1304 executes the waiting time updating processing S900 in parallel to the above frame storing S804. Although the waiting time updating S900 is executed in parallel to the frame storing S804 in the example shown in FIG. 24, the waiting time updating S900 may be executed before S804 or after S804 or S805.

Termination the processing in S805 or S900, the buffer write processor 1304 exits the sequence number check processing (S807).

On the other hand, if '1' is set in one of the receive bits 1362 and 1363 in S803, it means that a frame having the same content as that of the currently received frame is already stored in the input frame buffer 136. Consequently, the buffer write processor 1304 sets '1' in the receive bit 1382 or 1363 corresponding to the input port ID without updating the frame data 1364 (writing back the content of the frame data 1364 read in S802 in the input frame buffer 136 as is) (S806). Then, the buffer write processor 1304 exits the sequence number check processing (S807).

As a result of the comparison in S801, if the value of the sequence number SNnow 424 is under the value of the read counter 130B, a frame having the same content as that of the received frame or its subsequent frame is already requested for sending. This means that there is no need to store the received frame in the input frame buffer 136. Thus the buffer write processor 1304 discards the received frame and exits the sequence number check processing (S807).

Figure 25:
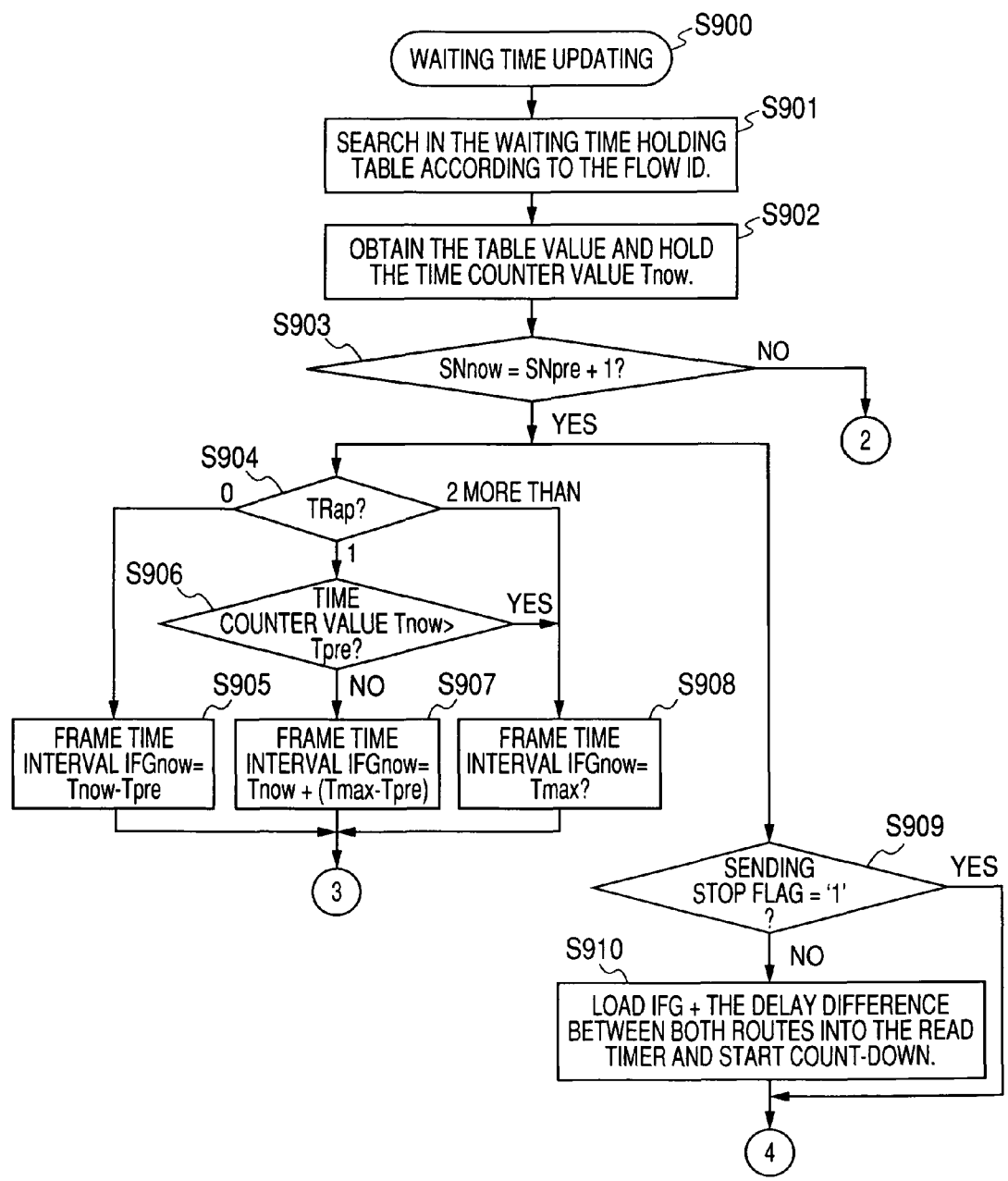
FIG. 25 is a first part of a flowchart of a waiting time updating processing executed by the buffer write processor in the second embodiment of the present invention.
Figure 26:
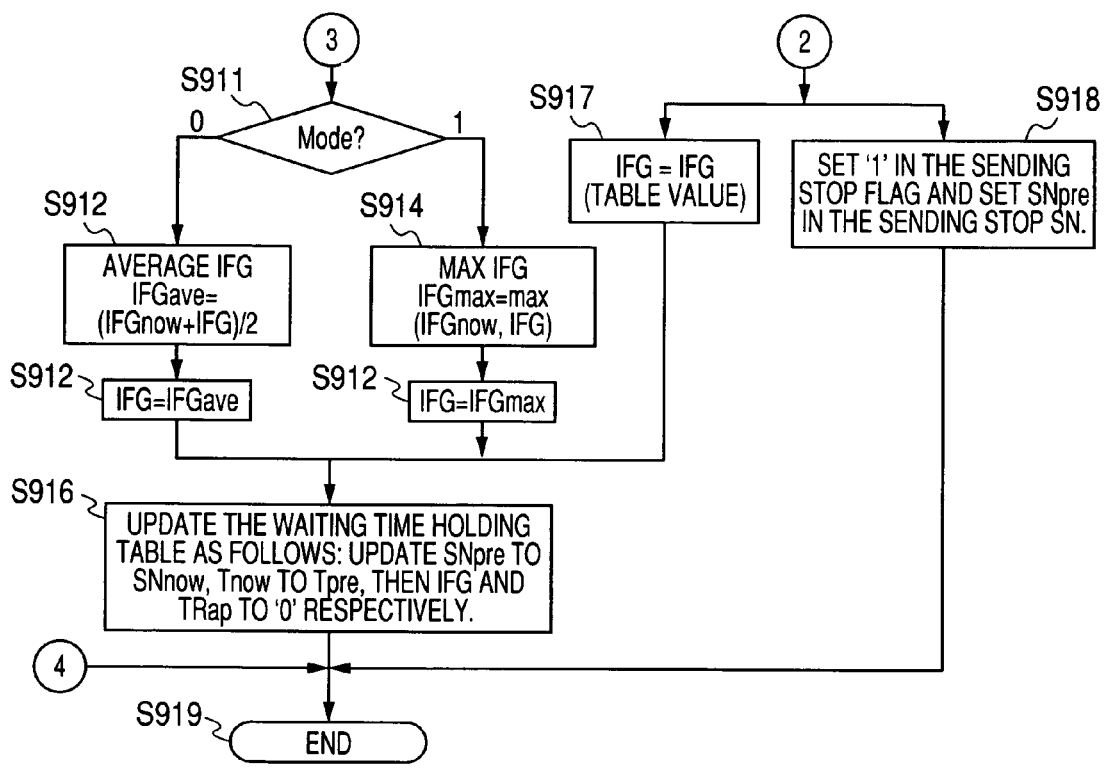
FIG. 26 is a second part of the flowchart of the waiting time updating processing executed by the buffer write processor in the second embodiment of the present invention.

FIGS. 25 and 26 show flowcharts of the waiting time updating processing S900 executed by the buffer write processor 1304 in this second embodiment of the present invention.

Then, the buffer write processor 1304 makes a search in the waiting time holding table 21 according to the flow ID 130C used as the search key (S901).

FIG. 27 shows a configuration of the waiting time holding table in this second embodiment of the present invention.

The waiting time holding table in this second embodiment holds entries of delay difference Ddif 212 between communication routes 0 NW0 and 1 NW1, calculation mode MODE 213, preceding sequence number SNpre 214, preceding arrival time Tpre 215, frame time interval IFG 216, and time counter lap count TLap 217.

The delay difference Ddif 212 is the same as that shown in FIG. 17.

The calculation mode MODE 213 represents a method to calculate the frame time interval IFG. The value '0' set in the Mode entry 213 denotes that the average value of the frame time intervals in the past is calculated as the frame time interval IFG. The value '1' denotes that the maximum value of the frame time intervals in the past is calculated as the frame time interval IFG. The calculated value is held in the field of the frame time interval IFG 216.

The preceding sequence number SNpre 214, the preceding arrival time Tpre 215, and the frame time interval IFG 216 are fields to be updated each time a frame is received. In the field of preceding sequence number SNpre 214 is overwritten the sequence number of each received frame. In the field of preceding arrival time Tpre 215 is overwritten the value of the timer counter 130J each time a frame is received. In the field of frame time interval IFG 216 is overwritten a frame time interval calculated according to the value in the field of Mode 213.

The time counter lamp count TLap 217 denotes whether or not how many times the time counter 130J is reset to '0' from the maximum value between the previous table updating and the current time. The time counter 130J holds the current time. The time held in this time counter 130J is counted up at each clock according to the operation frequency of the subject packet transfer apparatus.

Next, there will be described the processing that follows S901 with reference to FIG. 25 again.

The buffer write processor 1304 makes a search in the waiting time holding table in S901. As a result, the buffer write processor 1304 obtains a value at which the flow identifier corresponds to the flow ID 211. The buffer controller 1301 to which the buffer write processor 1304 belongs is allocated to that flow. Furthermore, the buffer write processor 1304 holds the value of the time counter 130J as the time on which the frame is received this time, that is, the current arrival time Tnow (S902).

After this, the buffer write processor 1304 checks whether or not the value of the sequence number SNnow 424 set in the inner header 42 of the received frame is the same as the value obtained by adding '1' to the value of the preceding sequence number SNpre 214 obtained in S902 (S903).

If both of the values are the same in S903, the buffer write processor 1304 checks the value of the time counter TLap 217 obtained in S902 (S904).

The processings in S904 to S908 are executed to calculate a frame time interval between the currently received frame and the precedingly received frame. In principle, the frame time interval can be calculated by subtracting the value of the preceding arrival time Tpre 215 from the value of the current arrival time Tnow obtained from the time counter 130J. However, because the number of digits in the time counter 130J is limited, the value of the time counter 130J is returned to '0' from the maximum value, then counted up cyclically. At this time, '1' is added to the value of the time counter TLap 217. Consequently, the frame time interval is required to be calculated according to the currently arrival time Tnow, the preceding arrival time Tpre 215, and the time counter lap count TLap 217.

If '0' is set in the field of time counter TLap 217 in S904, the value of the time counter 130J does not reach the maximum value yet after the preceding frame is received. In this case, the buffer write processor 1304 subtracts the value of the preceding arrival time Tpre 215 from the Tnow and holds the result as the frame time interval IFGnow (S905).

If '1' is set in the field of the time counter lap count TLap 217 in S904, the value of the time counter 130J has reached the maximum value once after the preceding frame is received, then reset to '0'. In this case, the buffer write processor 1304 checks whether or not the value Tnow of the time counter 130J is larger than the value of the preceding arrival time Tpre 215 (S906).

If the value of the time counter Tnow 130J is under the value of the preceding arrival time Tpre 215 in S906, the buffer write processor 1304 adds the value obtained by subtracting the value of Tpre 215 from the maximum value Tmax of the time counter 130J to the value Tnow. The buffer write processor 1304 then holds the result of the addition as the frame time interval IFGnow (S907).

If the value of the time counter Tnow 130J is over the value of the preceding arrival time Tpre 215 in S906 and the value of the time counter lap count TLap is over '2' in S904, respectively, the actual frame time interval is larger than Tmax. In this case, the buffer write processor 1304 holds the value Tmax as the frame time interval IFGnow (S908). Here, Tmax should be set over the maximum delay time within an upper limit range of the network.

Completing the processing in S905, S907, or S908, the buffer write processor 1304 checks the calculation mode Mode 213 (S911).

If '0' is set in the field of the calculation mode Mode 213 in S911, the buffer write processor 1304 sets the average value of frame time intervals as the value of the frame time interval IFG 216. In this case, the buffer write processor 1304 calculates (IFGnow+IFG 216)/2 as the average frame time interval (IFGave) (S912). Then, the buffer write processor 1304 holds the calculated IFGave as the value IFG to be written back in the waiting time holding table 21 (S913).

If '1' is set in the field of the calculation mode Mode 213 in S911, the buffer write processor 1304 sets the maximum frame time interval value as the frame time interval IFG 216. In this case, the buffer write processor 1304 calculates (IFGnow, IFG 216) as the maximum frame time interval (IFGmax) (S914). Here, the max (A, B) is a function meaning that A or B, whichever is larger, is selected. Furthermore, other conditions may be added to the condition of the function; for example, such a condition may be that a value over a certain value is not selected or a value over a certain multiple of B is not selected. Consequently, if the IFGnow is so large at a break of a traffic, its IFGnow value can be excluded there.

After that, the buffer write processor 1304 holds the calculated IFGmax as the value IFG to be written back into the waiting time holding table 21 (S915).

In parallel to the processing in S904, the buffer write processor 1304 checks the sending stop flag 130G held by the buffer controller 1301 corresponding to the subject flow ID (S909).

If '0' is set in the sending stop flag 130G in S909, the buffer write processor 1304 adds the delay difference Ddif 212 between routes 0 and 1 to the obtained frame time interval IFG 216 and sets the result in the field of the read timer 130E, then begins count-down of the timer 130E (S910). '1' is set in the sending stop flag 130G when the buffer write processor 1304 detects a sequence number loss. While '1' is set in this sending stop flag 130G, the buffer write processor 1304 stops the frame sending and waits for arrival of a frame having the same sequence number as that of the lost frame.

The buffer write processor 1304, after executing the processing in S910, exits the waiting time updating processing (S919).

If '1' is set in the sending stop flag 130G in S909, the buffer write processor 1304 exits the waiting time updating processing without updating the read timer 130E (S919).

FIG. 25 shows an example in which the buffer write processor 1304 executes the processings in S909 to S910 in parallel to the processings S904 to S908, as well as S911 to S919. However, the buffer write processor 1304 may execute the processings in S909 and S910 before the processing in S904 or after the processing S916. In other words, the buffer write processor 1304 may execute the processing in S904 after the processings in S909 to S910 or may execute the processing in S909 after the processing in S916.

If the value of the sequence number SNnow 424 is not the same as a value obtained by adding '1' to the value of the preceding sequence number SNpre 214 in 903, the buffer write processor 1304 determines that a sequence number loss has occurred due to a frame loss. In this case, the buffer write processor 1304 holds the frame time interval IFG 216 obtained in S902 as the value IFG to be written back into the waiting time holding table (S917).

Upon completing the processing in S913, S915, or S917, the buffer write processor 1304 updates the waiting time holding table 21 (S916). Concretely, among the table values obtained in S902, the buffer write processor 1304 writes back the value of SNnow 424 in the field of the preceding sequence number SNpre 214, the value Tnow of the current time counter 130J in the field of the preceding arrival time Tpre 215, the write-back value IFG in the field of the frame time interval IFG 216, and '0' in the field of the time counter lap count TLap, respectively.

Upon completing the processing in S916, the buffer write processor 1304 exits the waiting time updating processing (S919).

In parallel to the processing in S917, the buffer write processor 1304 sets '1' in the sending stop flag 130G and sets the value of the SNpre 214 in the field of the sending stop SN130H (S918). As a result, in the sending stop SN130H is held the preceding sequence number of the lost one (that means the sequence number of the last sent-out frame).

Upon the completion of the processing in S918, the buffer write processor 1304 exits the waiting time updating processing (S919).

While FIG. 26 shows an example in which S918 is executed in parallel to S917, S917 may be executed after S918 or S918 may be executed after S917.

The buffer read processor 1305 in this second embodiment executes the send frame request processing S400 shown in FIG. 13. However, the buffer read processor 1305 executes the processing of the request to send frames in the order of sequence numbers S1000 shown in FIG. 28 instead of the processing of the request to send frames in the order of sequence numbers S500.

Figure 28:
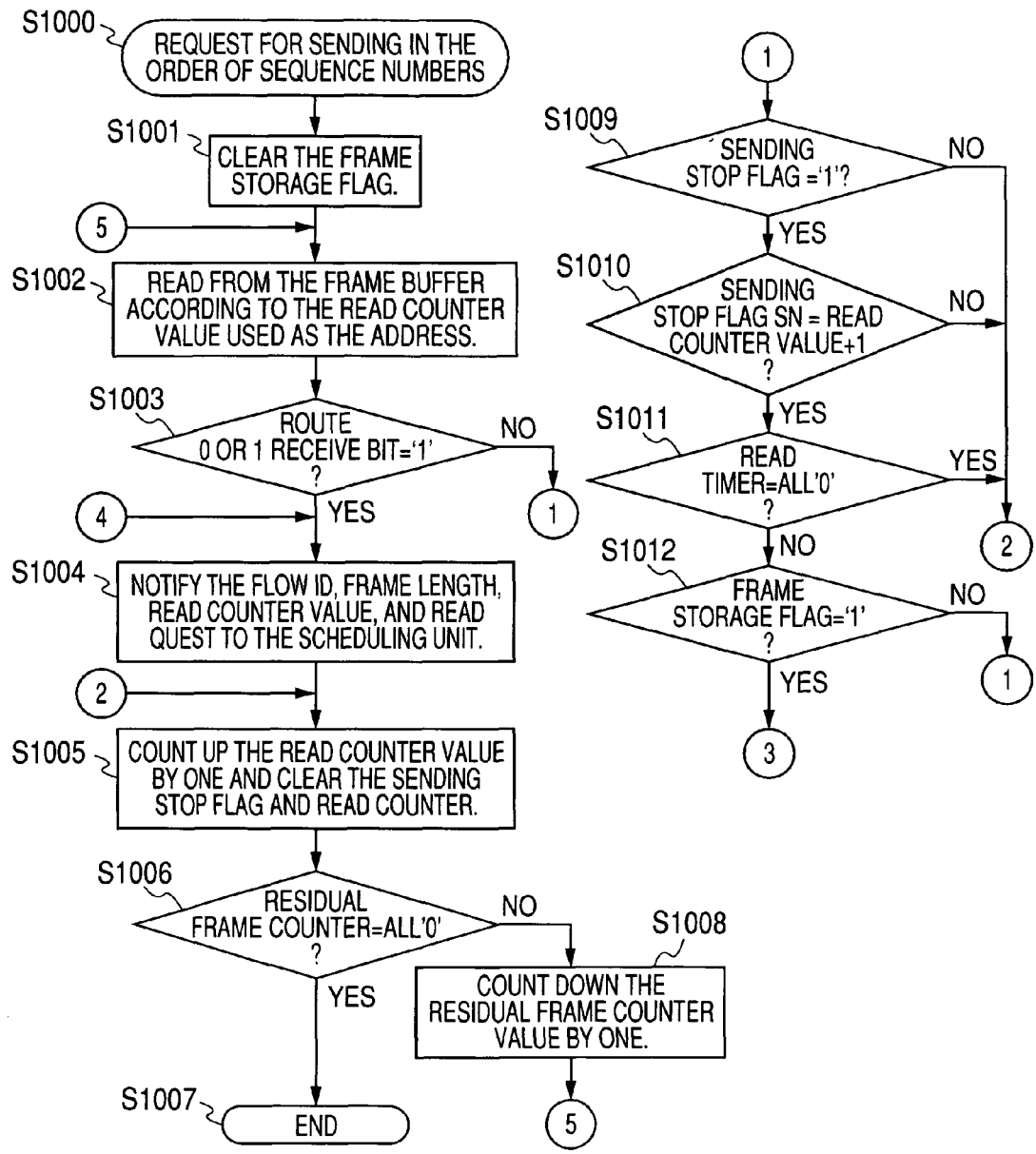
FIG. 28 is a first part of a flowchart of a processing to send frames in the order of sequence numbers, executed by the buffer read processor in the second embodiment of the present invention.
Figure 29:
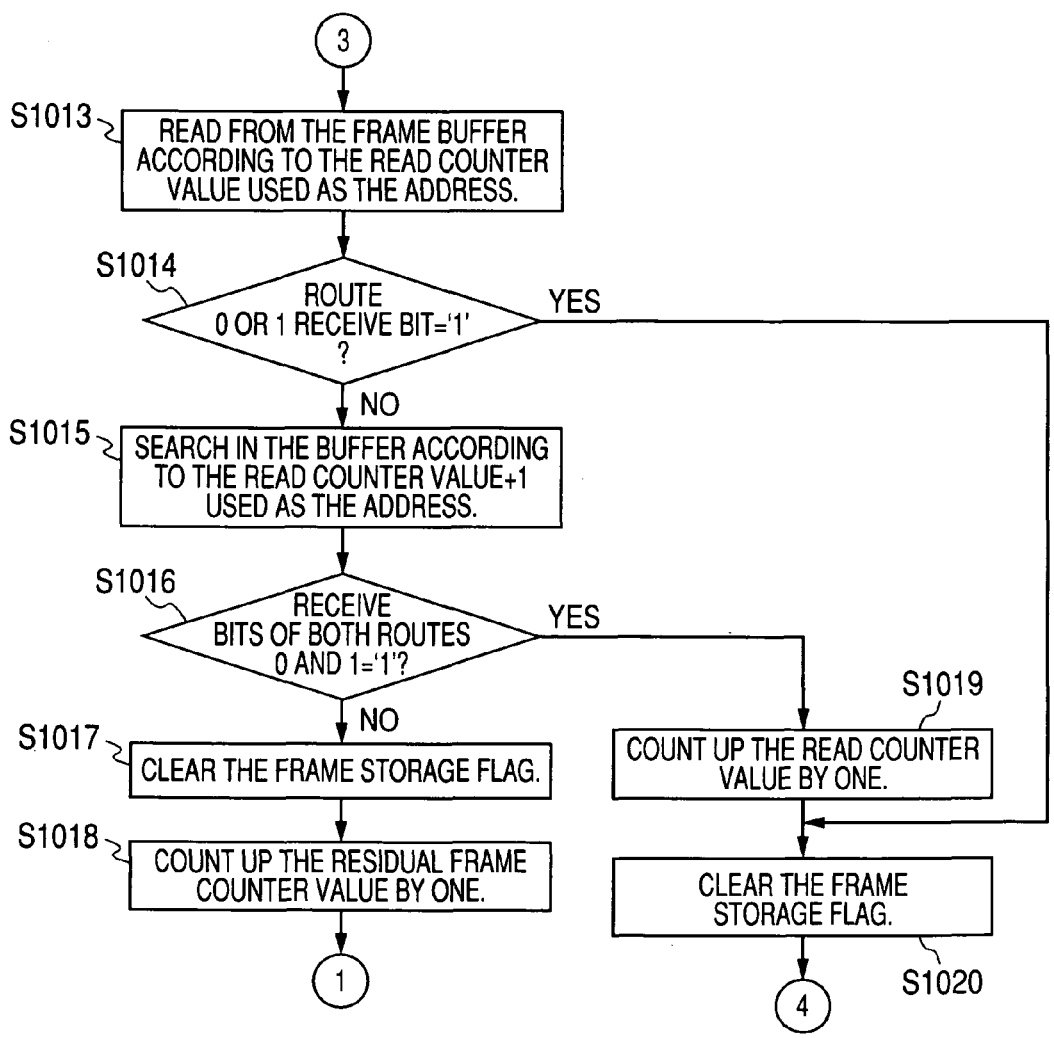
FIG. 29 is a second part of the flowchart of the processing to send frames in the order of sequence numbers, executed by the buffer read processor in the second embodiment of the present invention.

FIGS. 28 and 29 show flowcharts of the processing of the request to send frames in the order of sequence numbers S1000 executed by the buffer read processor 1305 in this second embodiment of the present invention.

Upon the start of the processing of the request to send frames in the order of sequence numbers S1000, the buffer read processor 1305 clears the frame storage flag (S1001).

Then, the buffer read processor 1305 reads the necessary data from the input frame buffer 136 according to the value of the read counter 130B used as the read address (S1002).

After this, the buffer read processor 1305 checks the receive bits 1362 and 1363 of both of the routes 0 and 1 read from the input frame buffer 136 (S1003). As a result of the check, if '1' is held in any one of the receive bits 1362 and 1363, the buffer read processor 1305 determines that a frame is stored in the address denoted by the value of the read counter 13B provided in the input frame buffer 136. In this case, the buffer read processor 1305 sends the values of both the flow ID 130C and the read counter 130B together with a send frame request to the scheduling unit 132 (S1004).

The buffer read processor 1305 then counts up the value of the read counter 130B by one (S1005).

After this, the buffer read processor 1305 checks whether or not all '0' is set in the field of the residual frame counter 130D (S1006).

If the check result in S1006 is YES (all '0' set), it means that there is no frame remained in the input frame buffer 136. In this case, the buffer read processor 1305 exits the processing of the request to send frames in the order of sequence numbers (S1007).

On the other hand, if the check result in S1006 is NO (all '0' not set), it means that there is a frame remained in the input frame buffer 136. In this case, the buffer read processor 1305 counts down the value in the residual frame counter 130D by one (S1008).

After this, the buffer read processor 1305 executes the processings in and after S1002 again.

If '0' is set in both of the receive bits 1362 and 1363 in S1003, the buffer read processor 1305 determines that a sequence number is lost. In this case, a frame loss has occurred in either of the two communication routes 0 and 1. The buffer read processor 1305 is thus required to wait for the arrival of the frame. And the buffer read processor 1305 checks the sending stop flag 130G (S1009).

If '1' is set in the sending stop flag 130G in S1009 the buffer read processor 1305 checks whether or not the value obtained by adding '1' to the value in the read counter 130B is the same as the value of the sending stop SN 130H (S1010).

If the check result in S1010 is YES (equal), the buffer read processor 1305 determines that the frame having the sequence number denoted by the current read counter 130B is lost. In this case, the buffer read processor 1305 checks whether or not all '0' is set in the field of the read timer 130E (S1011).

If the check result in S1011 is NO (not all '0'), it means that the buffer read processor 1305 is still waiting for the arrival of the frame. Consequently, the buffer read processor 1305 checks whether or not '1' is set in the frame storage flag 130A (S1012).

If the check result in S1012 is YES ('1' set), it means that a frame has arrived before the time set in the read timer 130E expires. In this case, the buffer read processor 1305 reads the frame from the input frame buffer 136 according to the value of the read counter 130B used as the read address (S1013).

After this, the buffer read processor 1305 checks whether or not '1' is set in the receive bit 1362 or 1363 (S1014).

If the check result in S1014 is YES ('1' set), it means that a frame having the same sequence number as the lost one determined in S1003 has arrived. In this case, the buffer read processor 1305 clears the frame storage flag 130A (S1020). Then, the buffer read processor 1305 executes the processings in and after S1004 to generate a send frame request with respect to the arrived sequence number.

If the check result in S1014 is NO ('0' set in both), it means that there has been arrived a frame having a sequence number other than the lost one. In this case, the buffer read processor 1305 reads the frame from the input frame buffer 136 according to the value obtained by adding '1' to the value of the read counter 130B used as the read address, thereby checking whether or not a frame having the next sequence number of the lost one has been received from both of the two communication routes 0 and 1 (S1015). The buffer read processor 1305 then checks whether or not '1' is set in both of the receive bits 1362 and 1363 (S1016).

If the check result in S1016 is YES ('1' set in both), the buffer read processor 1305 determines that the frame having the lost sequence number has been lost in both of the communication routes 0 and 1. In this case, the buffer read processor 1305 counts up the value in the read counter 130B by one (S1019). The buffer read processor 1305 then executes the processings in and after S1020 to generate a send frame request with respect to the frame having the next sequence number of the lost one.

If the check result in S1016 is NO ('0' set in either), the buffer read processor 1305 is still waiting for the arrival of the frame having the lost sequence number. Consequently, the buffer read processor 1305 clears the frame storage flag 130A (S1017), then counts up the value in the residual frame counter 130D by one (S1018) and executes the processings in and after S1009.

If '0' is set in the sending stop flag 130G in S1009, it means that the buffer read processor 1305 is not waiting for any frame. In this case, therefore, the buffer read processor 1305 executes the processings in and after S1005 to generate a send frame request with respect to the frame having the next sequence number.

If the check result in S1010 is NO (not equal), the buffer read processor 1305 determines that there has occurred a frame change; the frame having the sequence number of which sending should be stopped is changed to another. In this case, the buffer read processor 1305 executes the processings in and after S1005 to generate a send frame request with respect to the frame having the next sequence number.

If the check result in S1011 is YES (all '0'), the buffer read processor 1305 determines that the frame having the lost sequence number has been lost in both of the communication routes 0 and 1. In this case, the buffer read processor 1305 executes the processings in and after S1005 to generate a send frame request with respect to the frame having the next sequence number of the lost one.

If the check result in S1012 is NO ('0' set), the buffer read processor 1305 keeps waiting for the frame having the lost sequence number. Consequently, the buffer read processor 1305 executes the processings in and after S1009.

Next, there will be described a case in which the SN:2 frame 302 is lost, so that the packet transfer apparatus 10N receives the SN:3 frame 303 after receiving the SN:1 frame 301. In this case, if the packet transfer apparatus 10N receives the SN:2 frame 312 before the waiting time expires after receiving the frame 301, it means that all '0' is not set in the read timer field 130E in S1011. In this case, the waiting time is a total of the delay difference 81 between both routes and the average frame time interval 82. And it is determined in S1012 that '1' is set in the frame storage flag 130A. Furthermore, it is determined in S1014 that '1' is set in the receive bit 1363 of the communication route 1.

In the example shown in FIG. 21, if the SN:2 frame 312 is also lost and the packet transfer apparatus 10N receives the SN:3 frame 313 before the waiting time expires, it means that all '0' is not set in the read timer 130E in S1011 and '1' is set in the frame storage flag 130A in S1012. Furthermore, it means that '0' is set in both of the receive bits 1362 and 1363 of the communication routes 0 and 1 in S1014 and '1' is set in both of the receive bits 1362 and 1363 of the communication routes 0 and 1 in S1016.

In the example shown in FIG. 2, if the waiting time expires while the packet transfer apparatus 10N receives none of the SN:2 frame 312 and the SN:3 frame 313, it means that all '0' is set in the read timer 130E in S1011.

As described above, according to the second embodiment of the present invention, just like the first embodiment, it is possible to prevent a case in which frame transfer cannot be restarted while a frame to be transferred is held. Furthermore, according to this second embodiment, a timing to restart frame transfer is determined by a frame time interval of each flow. Consequently, the present invention can apply appropriately to the characteristics of the subject traffic.

What is claimed is:

1. A data transfer apparatus, comprising:
    a plurality of interfaces connected to one or more communication routes;
    a buffer that stores data temporarily; and
    a buffer control unit that controls the buffer,
    wherein the plurality of interfaces includes a first interface and a second interface,
    wherein the plurality of communication routes includes a first communication route connected to the first interface and a second communication connected to the second interface,
    wherein the first interface is configured to receive sequentially ordered data from the first route and the second interface is configured to receive the sequentially ordered data from the second routes,
    wherein the sequentially ordered data includes a first data and a second data that is sequentially ordered subsequent to the first data
    wherein the buffer control unit, if the data transfer apparatus receives the second data from the first communication route before receiving the first data, stores the received second data in the buffer,
    wherein the buffer control unit, if the data transfer apparatus receives the second data from the first communication route before receiving the first data and then receives the first data from the second communication route, stores the received first data in the buffer, reads the first and second data in sequential order from the buffer, and sends the first and second data to one of the plurality of interfaces,
    wherein the buffer control unit, if the data transfer apparatus receives the second data from both the first and second communication routes before receiving the first data, reads the second data from the buffer and sends the second data to one of the plurality of interfaces, and
    wherein the buffer control unit, if the data transfer apparatus receives the second data from the first communication route before receiving the first data and has not received the first data upon expiration of a predetermined waiting time, reads the second data from the buffer and sends the second data to one of the plurality of interfaces.

2. The data transfer apparatus according to claim 1, wherein the buffer control unit determines whether expiration of the predetermined waiting time has occurred, and wherein the predetermined waiting time is started upon the data transfer apparatus receiving the second data from the first communication route.

3. The data transfer apparatus according to claim 2, wherein the predetermined waiting time is a transfer delay time difference between the first communication route and the second communication route.

4. The data transfer apparatus according to claim 1, wherein the buffer control unit determines whether expiration of the predetermined waiting time has occurred, and wherein the predetermined waiting time is started upon the data transfer apparatus receiving a third data of the sequentially ordered data that is sequentially ordered preceding to the first data from the first communication route.

5. The data transfer apparatus according to claim 4, wherein the buffer control unit, each time the data transfer apparatus receives the data from each of the plurality of communication routes, measures the time interval between each received data and its precedingly received data to find an average value of the plurality of the measured time intervals, and wherein the predetermined waiting time is a value obtained by adding the transfer delay difference between the first communication route and the second communication route to the average value of the measured time intervals.

6. The data transfer apparatus according to claim 4, wherein the buffer control unit, if the data transfer apparatus receives the data from each of the plurality of communication routes, measures a time interval between each received data and its precedingly received data to find the maximum value of the plurality of measured time intervals, and wherein the predetermined waiting time is a value obtained by adding the transfer delay difference between the first communication route and the second communication route to the maximum value of the measured time intervals.

7. The data transfer apparatus according to claim 1, wherein the apparatus is connected to a different data transfer apparatus through the first and second communication routes, wherein the buffer control unit, if the data transfer apparatus receives data that should be sent to the different data transfer apparatus from one of the plurality of communication routes, creates a copy of the received data, wherein the buffer control unit assigns a same sequence number to both of the received data and the copy of the received data, wherein the buffer control unit assigns the identifier of the interface of the different data transfer apparatus connected to the first communication route to one of the received data and the copy of the received data and assigns the identifier of the interface of the different data transfer apparatus connected to the second communication route to the other as destination information, respectively, and wherein the first and second interfaces send the sequentially numbered and destination information added received data and the copy of the received data to the different data transfer apparatus.

8. A data transfer method employed for a data transfer apparatus that includes a plurality of interfaces connected to one or more communication routes; a buffer that stores data temporarily; and a buffer control unit that controls the buffer, wherein the plurality of interfaces include a first interface and a second interface and the plurality of communication routes include a first communication route connected to the first interface and a second communication route connected to the second interface,
wherein the first interface is configured to receive sequentially ordered data from the first route and the second interface is configured to receive the sequentially ordered data from the second routes,
wherein the sequentially ordered data includes a first data and a second data that is sequentially ordered subsequent to the first data,
wherein the method includes the steps of:
storing received second data in the buffer if the data transfer apparatus receives the second data from the first communication route before receiving the first data;
storing the received first data in the buffer if the data transfer apparatus receives the second data from the first communication route before receiving the first data and then receives the first data from the second communication route and then reading the first and second data in sequential order from the buffer to send to one of the plurality of interfaces;
reading the second data from the buffer if the data transfer apparatus receives the second data from both the first and second communication routes before receiving the first data to send to one of the plurality of interfaces;
checking, if the data transfer apparatus receives the second data from the first communication route before receiving the first data and has not received the first data, whether or not a predetermined waiting time has expired; and
reading the second data from the buffer upon determining that the predetermined waiting time has expired to send to one of the plurality of interfaces.

9. The method according to claim 8, wherein the predetermined waiting time is determined to have expired in the procedure that checks expiration of the predetermined waiting time, and wherein the predetermined waiting time is started upon the data transfer apparatus receiving the second data from the first communication route.

10. The method according to claim 9, wherein the predetermined waiting time is a transfer delay difference between the first communication route and the second communication route.

11. The method according to claim 8, wherein the predetermined waiting time is determined to have expired in the procedure that checks expiration of the predetermined waiting time, and wherein the predetermined waiting time is started upon the data transfer apparatus receiving a third data of the sequentially ordered data that is sequentially ordered preceding to the first data from the first communication route.

12. The method according to claim 11, wherein the method further includes the steps of:
measuring a time interval between each received data and its precedingly received data when the data transfer apparatus receives the data from each of the plurality of communication routes; and
calculating an average value of a plurality of the measured time intervals, and
wherein the predetermined waiting time is a value obtained by adding a transfer delay difference between the first communication route and the second communication route to the average value of the calculated time intervals.

13. The method according to claim 11, wherein the method further includes the steps of:
measuring a time interval between each received data and its precedingly received data each time the data transfer apparatus receives the data from each of the plurality of communication routes; and
calculating the maximum value of a plurality of the measured time intervals, and
wherein the predetermined waiting time is a value obtained by adding a transfer delay difference between the first communication route and the second communication route to the maximum value of the calculated time intervals.

14. The method according to claim 8, wherein the data transfer apparatus is connected to a different data transfer apparatus through the first and second communication routes, wherein the method further includes the steps of:
creating a copy of received data if the data transfer apparatus receives the data that should be sent to the different data transfer apparatus from any one of the plurality of communication routes;
assigning a same sequence number to the received data and its copy;
assigning the identifier of an interface of the different data transfer apparatus connected to the first communication route to one of the received data and its copy as destination information and assigning the identifier of an interface of the different data transfer apparatus connected to the second communication route to the other of the received data and its copy as destination information; and
sending the sequentially numbered and destination information added received data and its copy to the different data transfer apparatus through the first and second communication routes.

* * * * *